(12) United States Patent
Monzen et al.

(10) Patent No.: US 10,126,751 B2
(45) Date of Patent: Nov. 13, 2018

(54) LANE CHANGE SUPPORT DEVICE

(71) Applicant: ZENRIN CO., LTD., Kitakyushu-shi (JP)

(72) Inventors: Daiki Monzen, Kitakyushu (JP); Tatsuya Furuno, Kitakyushu (JP); Hiroyuki Ohara, Kitakyushu (JP)

(73) Assignee: ZENRIN CO., LTD., Kitakyushu-shi (JP)

( * ) Notice: Subject to any disclaimer, the term of this patent is extended or adjusted under 35 U.S.C. 154(b) by 13 days.

(21) Appl. No.: 15/413,877

(22) Filed: Jan. 24, 2017

(65) Prior Publication Data

US 2017/0227966 A1 Aug. 10, 2017

(30) Foreign Application Priority Data

Feb. 10, 2016 (JP) ................................. 2016-023280

(51) Int. Cl.
*G05D 1/02* (2006.01)
*B62D 15/02* (2006.01)
*G01C 21/36* (2006.01)
*G05D 1/00* (2006.01)

(52) U.S. Cl.
CPC ....... *G05D 1/0212* (2013.01); *B62D 15/0255* (2013.01); *G01C 21/36* (2013.01); *G05D 1/0022* (2013.01)

(58) Field of Classification Search
CPC ............... G05D 1/0212; G05D 1/0022; B62D 15/0255; G01C 21/36
See application file for complete search history.

(56) References Cited

U.S. PATENT DOCUMENTS

2015/0260530 A1* 9/2015 Stenborg ................ G01C 21/30
701/461
2016/0068156 A1* 3/2016 Horii ..................... B60W 30/00
701/28

FOREIGN PATENT DOCUMENTS

| JP | 2007-127598 | 5/2007 |
|---|---|---|
| JP | 2013-19803 | 1/2013 |
| JP | 2014-16369 A | 1/2014 |
| JP | 2015-64786 A | 4/2015 |

\* cited by examiner

*Primary Examiner* — Richard M Camby
(74) *Attorney, Agent, or Firm* — Oblon, McClelland, Maier & Neustadt, L.L.P.

(57) ABSTRACT

A lane change support device includes memory circuitry and control circuitry. The memory circuitry is configured to store at least one of a plurality of control levels having different reasons for restricting a lane change for each lane of a road in association with a position on the lane. The control circuitry is configured to support the lane change of a vehicle with reference to a control level of the lane change at the position on the lane in which the vehicle runs.

15 Claims, 18 Drawing Sheets

FIG. 4

| LINK DATA | |
|---|---|
| LINK ID | L1 |
| COORDINATE POINT ROW * | x, y, z |
| LANE NW ID * | 1001, ···, 3004 |
| ... | |
| LINK ID | L2 |
| ... | |

* : PORTION TO WHICH A PLURALITY OF VALUES ARE INPUT

| LANE NW DATA | 32 |
|---|---|
| LANE NW ID | 1000 |
| COORDINATE POINT ROW * | x, y, z |
| ENTRANCE SIDE LANE ID * | 999 |
| EXIT SIDE LANE ID * | 1001 |
| LANE NW ATTRIBUTE ID | 100 |
| ... | |
| LANE NW ID | 3004 |
| ENTRANCE SIDE LANE ID * | 2999 |
| EXIT SIDE LANE ID * | 3005 |
| LANE NW ATTRIBUTE ID | 304 |
| ... | |

| LANE NW ATTRIBUTE DATA | 35 |
|---|---|
| LANE NW ATTRIBUTE ID | 100 |
| LANE NW ID OF LEFT LANE | N/A |
| LANE CHANGE ALLOWABLE LEVEL FOR LANE CHANGE INTO LEFT LANE | 1 |
| LANE NW ID OF RIGHT LANE | 2000 |
| LANE CHANGE ALLOWABLE LEVEL FOR LANE CHANGE INTO RIGHT LANE | 5 |
| LANE NW ATTRIBUTE ID | 101 |
| LANE NW ID OF LEFT LANE | 1000 |
| LANE CHANGE ALLOWABLE LEVEL FOR LANE CHANGE INTO LEFT LANE | 1 |
| LANE NW ID OF RIGHT LANE | 2001 |

| | |
|---|---|
| LANE CHANGE ALLOWABLE LEVEL FOR LANE CHANGE INTO RIGHT LANE | 5 |
| ... | |
| LANE NW ATTRIBUTE ID | 304 |
| LANE NW ID OF LEFT LANE | 2004 |
| LANE CHANGE ALLOWABLE LEVEL FOR LANE CHANGE INTO LEFT LANE | 3 |
| LANE NW ID OF RIGHT LANE | N/A |
| LANE CHANGE ALLOWABLE LEVEL FOR LANE CHANGE INTO RIGHT LANE | 1 |
| ... | |

36

| | LANE CHANGE ALLOWABLE LEVEL DATA |
|---|---|
| 1 | PHYSICAL OBSTACLE (UNALLOWABLE RIDE-OVER) |
| 2 | PHYSICAL OBSTACLE (ALLOWABLE RIDE-OVER) |
| 3 | PRESENCE OF LEGAL RESTRICTION |
| 4 | ABSENCE OF LEGAL RESTRICTION (NOT RECOMMENDED) |
| 5 | ABSENCE OF LEGAL RESTRICTION (RECOMMENDED) |

PROCESS OF S335

PROCESS OF S340

FIG. 17

★ TABLE DT OF LANE CHANGE ALLOWABLE LEVEL

| STATE OF REAL ROAD | LEVEL | LINE TYPE CODE | EXAMPLE |
|---|---|---|---|
| PRESENCE OF PHYSICAL OBSTACLE (UNALLOWABLE RIDE-OVER) | 1 | — | WALL, FENCE, GUARDRAIL, DELINEATOR |
| PRESENCE OF PHYSICAL OBSTACLE (ALLOWABLE RIDE-OVER) | 2 | — | ROAD CONE (PYLON), POLE CONE, CAT'S-EYE |
| PRESENCE OF LEGAL RESTRICTION | 3 | WHITE SOLID LINE, YELLOW SOLID LINE | — |
| ABSENCE OF LEGAL RESTRICTION | 4 | WHITE BROKEN LINE | — |

LANE CHANGE SUPPORT DEVICE

CROSS-REFERENCE TO RELATED APPLICATION

This application claims priority based on Japanese Patent Application No. 2016-023280, filed on Feb. 10, 2016, the entire contents of which are incorporated by reference herein.

BACKGROUND

1. Technical Field Disclosure

The present disclosure relates to technology for supporting a lane change of a vehicle or performing the lane change.

2. Related Art

Navigation devices guiding running of vehicles perform simple route search, as well as various driving supports in recent years.

As one of them, a technology for supporting a lane change in the vehicle is proposed. For example, in JP-A-2007-127598, support to preliminarily store lanes adjacent to an intersection at which no lane change is allowed, and to prohibit the lane change or to guide the lane change in advance in an intended running direction of a vehicle is performed. A technology is disclosed in JP-A-2013-19803 in which information about a control section of a lane change is stored and is informed a driver.

SUMMARY (1) As a first embodiment of the disclosure, a device for supporting a lane change in a vehicle is provided. This device includes: a road network information memory unit configured to store road network information corresponding to road map data; a running route decision unit configured to decide a running route of a vehicle using road network information; a lane change control level memory unit configured to store at least one of a plurality of control levels having different reasons for limiting a lane change in each lane that is present on a road in association with a position on the lane; a position acquisition unit configured to acquire position data of a location at which the vehicle runs; and a presentation unit configured to refer to the control level of the lane change at the decided running route of the vehicle based on the acquired position data of the vehicle and to present lane change information for running along the running route within the vehicle.

According to this lane change support device, since at least one of the plurality of control levels having different reasons for limiting the lane change in each lane that is present on a road is stored, the lane change information for running along the running route can be presented within the vehicle by referring to this control level. The presentation can be performed by a voice or an image, and driving accompanied with the lane change caused by a driver can be supported.

(2) In this lane change support device, contents of the lane change information may be changed according to a distance from a point at which the lane change should be completed to run on the decided running route of the vehicle. Thus, proper lane change information corresponding to the distance from the point at which the lane change should be completed can be presented.

(3) In the lane change support device, the point at which the lane change should be completed may be a location at which a lane change restriction lane by which the lane change is restricted is initiated. When the vehicle enters the lane change restriction lane by which the lane change is restricted, this is because the lane change cannot be performed in principle. Accordingly, when the contents of the lane change information are changed according to the distance from the location at which the lane change restriction lane is initiated, the lane change can be guided up to the initiation of the lane change restriction lane to take appropriate measures.

(4) In the lane change support device, the point at which the lane change should be completed may be at least one of an entrance location of an intersection, a width reduction location, and a branch location. Since all of these locations are points having a possibility of requiring the lane change, driving of a driver can be properly supported in any case.

(5) In the lane change support device, when the lane change performed up to the point at which the lane change should be completed is a lane change into an overtaking lane, the lane change information may be presented after a distance up to the point is less than or equal to a given distance. Thus, guide of the lane change into the overtaking lane can be initiated from an appropriate location. To perform the lane change into the overtaking lane too early is because it can be assumed to be an undesirable case.

(6) As a second embodiment of the disclosure, a vehicle control device for controlling a vehicle is provided. This vehicle control device may include: a running change unit configured to at least change a course of a vehicle that is running; a lane change control level memory unit configured to store at least one of a plurality of control levels having different reasons for limiting a lane change in each lane that is present on a road in association with a position on the lane; a position acquisition unit configured to acquire position data of a location at which the vehicle runs; a course change request unit configured to output a request for a course change of the vehicle along with a reason of the request; a determination unit configured to refer to the control level of the lane change associated with a position of the vehicle on the lane based on the acquired position data of the vehicle when the request for the course change is received, and to determine whether or not the lane change is allowed from a relation between the control level and the reason of the request for the course change; and a course change performing unit configured to control the running change unit to change the course of the vehicle based on the request for the course change when it is determined that the lane change is allowed by the determination unit.

According to this vehicle control device, since at least one of the plurality of control levels having different reasons for limiting the lane change in each lane that is present on the road is stored, it is possible to refer to the control level of the lane change associated with the position of the vehicle on the lane and to determine whether or not the lane change is allowed from the relation between the control level and the reason of the request for the course change. However, when it is determined that the lane change is allowed, the running change unit can be controlled to change the course of the vehicle based on the request for the course change. For this reason, the course change of the vehicle accompanied with the lane change can be easily realized. However, since it is determined whether or not the lane change is allowed from the relation between the control level and the reason of the request for the course change, it is possible to alter the determination of whether or not the lane change is allowed, for example, in the event of typical driving and in case of emergency. For example, a measure that a change into a lane prohibited during typical running can be performed in case of emergency is possible, the course change accompanied with the lane change can be performed to realize accident avoidance or the like.

(7) This vehicle control device may further include: a road network information memory unit configured to store road network information corresponding to road map data; a running route decision unit configured to decide a running route of the vehicle using the road network information; and a lane decision unit configured to refer to the control level of the lane change at the decided running route and to decide a lane in which the vehicle should run. The course change request unit may output a request for the course change to which the lane change is attributed based on current position data of the vehicle and the decided lane.

According to this vehicle control device, the request for the course change to which the lane change is attributed can be flexibly output according to circumstances.

(8) This vehicle control device may further include a detection unit configured to detect a target including another vehicle around the vehicle. The course change request unit may output the request for the course change to which accident avoidance is attributed based on a position relation between the detected target and the vehicle. Thus, since the request for the course change to which the accident avoidance is attributed can be output based on a preliminarily stored control level as well as a position relation between the vehicle and a target that is actually present on the spot, the accident avoidance can be more reliably performed.

The present disclosure can be carried out as methods corresponding to the above devices. Any method exerts effects corresponding to a device disclosure. Further, the disclosure can be carried out by an aspect other than the forgoing. For example, the disclosure can be carried out as a method of supporting a lane change or a vehicle control method, or a lane change support system or a lane change driving control system that is made up of a server and a vehicle. Alternatively, the disclosure can be carried out as an disclosure of a server that realizes these systems.

BRIEF DESCRIPTION OF THE DRAWINGS

FIG. 4 is an illustrative diagram illustrating an example of a data structure stored in a memory unit;

FIG. 17 is an illustrative diagram illustrating an example of a rule of a lane change allowable level.

DETAILED DESCRIPTION OF THE DISCLOSURE

First Embodiment

Figure 1:
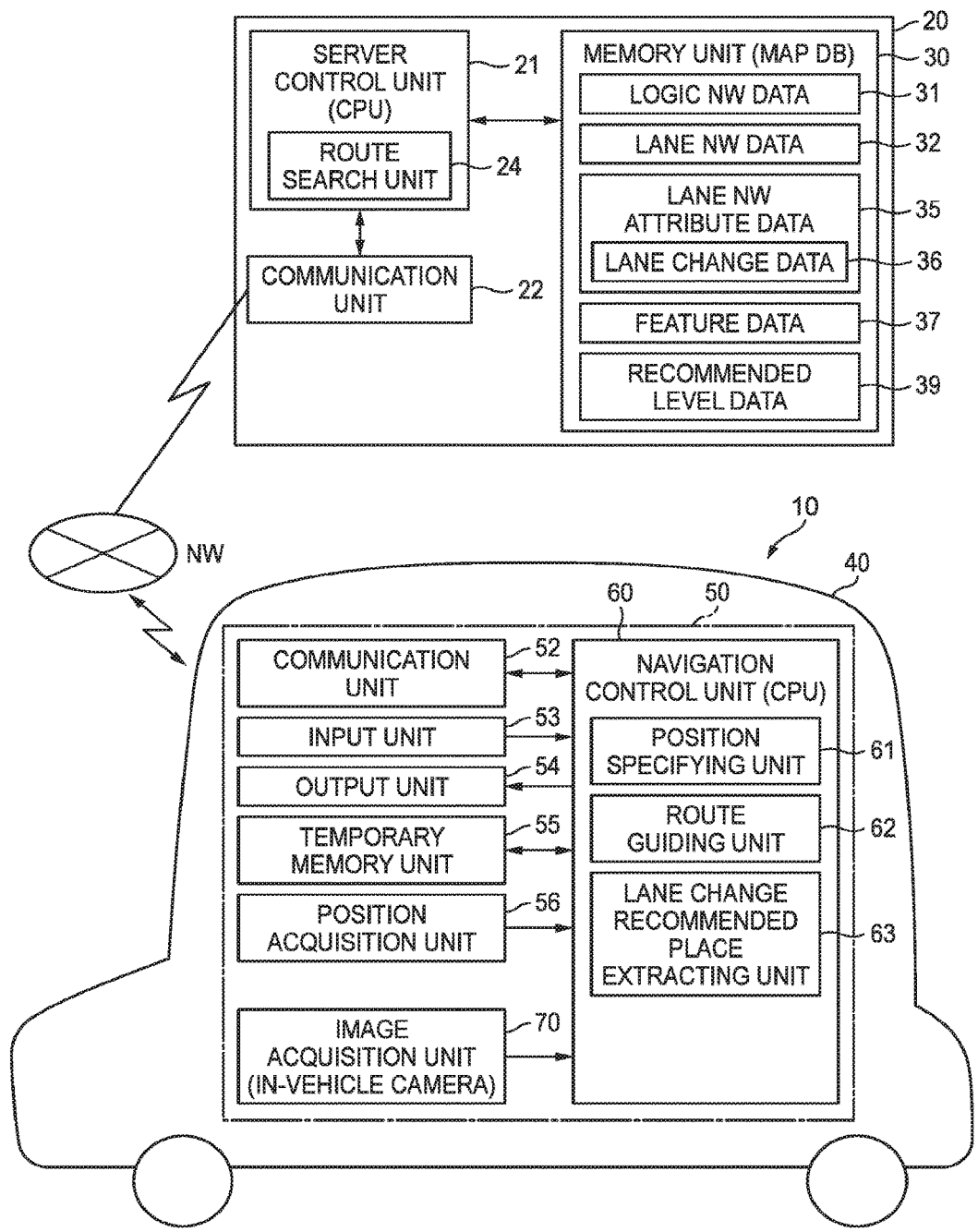
FIG. 1 is a schematic configuration diagram illustrating a schematic configuration of a lane change support system as a first embodiment.

Some embodiments of the disclosure will be described. FIG. 1 is a schematic configuration diagram illustrating a schematic configuration of a lane change support system 10 as a first embodiment. As illustrated in FIG. 1, this lane change support system 10 is provided with a server 20 that stores data required for route search and performs processes such as the route search, and a vehicle 40 that has a function of presenting various guides to a driver to support driving while exchanging the data with this server 20. The server 20 and the vehicle 40 are connected to a network NW. The vehicle 40 can be at least connected to the network NW by wireless. The connection of the server 20 and the network NW may be performed by wire or by wireless.

The server 20 is provided with a server control unit 21 realized by CPU, a communication unit 22 for performing data exchange with the network NW, and a memory unit 30 that stores various data. The server control unit 21 is provided with route search unit 24 for performing search for a road and a lane. The route search unit 24 is equivalent to a running route decision unit or a lane decision unit, and is realized as the server control unit 21 executes a given program. Various data required when the route search unit 24 performs the route search for the road or the lane are stored in the memory unit 30. This memory unit 30 functions as a memory unit of each information such as a road network information memory unit, a lane change control level memory unit, or a feature information memory unit, and at least stores road network (NW) data 31, lane NW data 32, lane NW attribute data 35, lane change allowable level data (abbreviated to "lane change data" in FIG. 1) 36, feature data 37 that are information about features, and recommended level data 39. Among them, the road NW data correspond to road map data, and are equivalent to road network information used for the route search. Since the road NW data 31 are not only based on, for example, road junction caused by a shape and an intersection of a real road but also reflect a logical junction relation for the search, the road NW data 31 are hereinafter referred to as "logic NW data 31," and the illustration follows this. Contents of these various data will be described in detail using FIGS. 2 and 3.

The vehicle 40 performing the data exchange with this server 20 is provided with a driving information device 50. The driving information device 50 presents information required of a driver, for example voice notification of a navigation system, without bearing direct relation to driving of the vehicle 40. This driving information device 50 is provided with the following devices connected to the navigation control unit 60 in addition to the navigation control unit 60 realized by the CPU, namely, a communication unit 52 that performs data exchange with the network NW, an input unit 53 that receives an instruction from a user, an output unit 54 that outputs route guide in various forms such as voice or screen display, a temporary memory unit 55 that temporarily stores data or the like, a position acquisition unit 56 that acquires a position of the vehicle by means of GNSS or the like, and an image acquisition unit 70 that is an in-vehicle camera acquiring images around the vehicle.

The navigation control unit 60 is provided therein with position specifying unit 61 for specifying a position of the vehicle 40 from GNSS data from the position acquisition unit 56 or an image or the like acquired by the image acquisition unit 70, route guiding unit 62 for performing the route guide, and lane change recommended place extracting unit 63 for specifying a recommended place for the lane change. As the CPU of the navigation control unit 60 executes a given program, each of these units 61 to 63 is realized. The program is stored in a storage medium such as ROM (not illustrated) or a hard disc, and is executed at a necessary timing by the navigation control unit 60.

The output unit 54 is equivalent to a presentation unit, and includes a color liquid crystal display device and a speaker. A touch panel is embedded in a display panel of the color liquid crystal display device. This touch panel constitutes a part of the input unit 53. As a button or the like for receiving an instruction from a user is displayed on the display panel of the output unit 54, and a region of the touch panel corresponding to a display area of this button is operated, the navigation control unit 60 recognizes that the button is pressed. In this way, the instruction caused by the user is input at a necessary timing. As the input unit, a configuration in which the instruction is directly input using voice recognition or the like may be adopted. The output unit 54 may be configured by a voice synthesizer or the like. The display panel such as the color liquid crystal display device may be configured to reflect an image or the like of the navigation system onto a front windshield and to make a driver (a user) visually recognize it. Specific configurations of the position specifying unit 61, the route guiding unit 62, the lane change recommended place extracting unit 63, and so on, which are provided for the navigation control unit 60, and operations thereof will be described below in detail.

Figure 2:
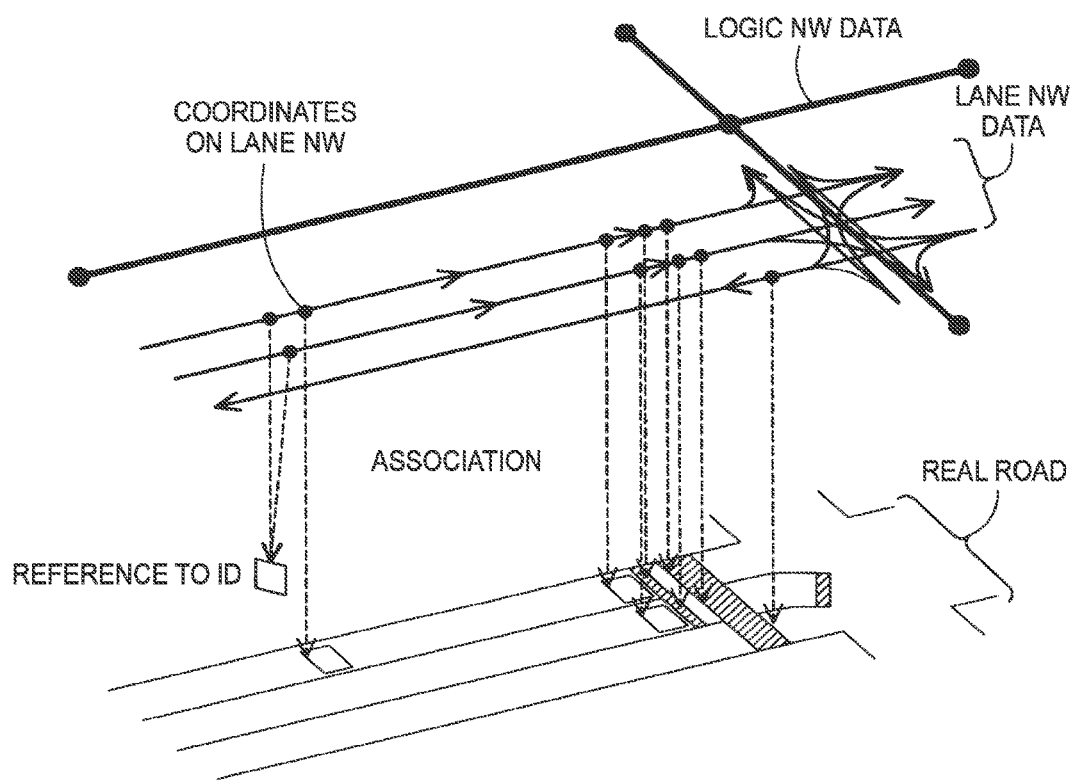
FIG. 2 is a schematic diagram illustrating a relation between logic network (NW) data and lane NW data.
Figure 3:
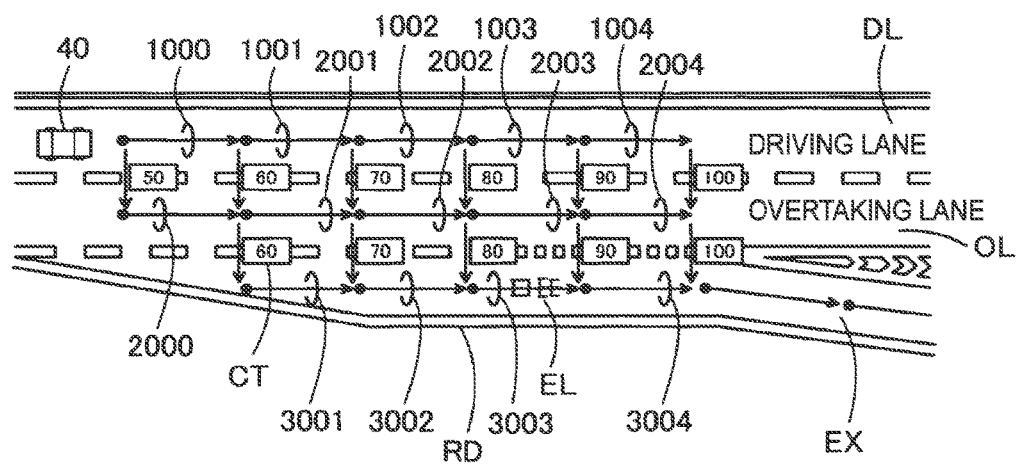
FIG. 3 is an illustrative diagram illustrating an example of a lane change route search.

Structures of the logic NW data 31 corresponding to the real road, the lane NW data 32, and the lane NW attribute data 35, and a corresponding relation will be described. FIG. 2 is a schematic diagram illustrating a relation between logic NW data and lane NW data, and FIG. 3 is an illustrative diagram illustrating an example of a lane change route search. FIG. 4 is an illustrative diagram illustrating an example of a data structure stored in a memory unit. As illustrated in FIG. 2, logic NW data are prepared for the route search in advance with respect to a real road. The logic NW data are logical data associated with a connection relation of the real road that is present in a zone targeted for the route search. These data are used for the route search of the road from a departure location (mostly a current location) to a destination location. When the route search is made, the connection relation of the real road is set as logic data including a link associated with the road and a node equivalent to a node between the links, but is preferable in view of a search process. The node is generally associated with an intersection or the like, but is provided at places where conditions of the route search, for example an entrance and an exit of a tunnel, or the like. The link is a piece of data interconnecting these nodes. In the present embodiment, the logic NW data used for the route search are prepared as a set of link data that are data regarding this link.

The data of each link (the link data) constituting the logic NW data is managed using a unique link ID. An example of the link data is illustrated at a left end of FIG. 4. All of the lane NW data 32 (to be described below) or the like are managed by assignment of these link IDs. Naturally, the structure of the logic NW data is not limited to that exemplified in FIG. 4, and may be any format if the route search and retrieval of other data are possible. For example, the structure may be constructed as a set of node data.

This logic NW data 31 and the lane NW data 32 that are information about the lane are associated by identifiers (IDs). As illustrated in FIG. 2, if the real road has three lanes altogether on both sides, the lane NW data may also be prepared as data in which three lanes are disposed in parallel. The lane NW data 32 are also managed as the link data interconnecting the nodes. An end of the link (a position at which the node is placed) in the lane NW data may be, as exemplified in FIG. 2, placed at a point, such as a crosswalk or a stop line, which has a direct influence on practical running of the vehicle. With regard to an intersection, one link is set from a crosswalk to a node closest to a position passing through the intersection, for example to a crosswalk situated at a passing position. Therefore, if the intersection is a four-way intersection at which crosswalks are present in all roads, there are lane NW data of four lanes that are a left-turn lane from a left lane, a straight-running lane from the left lane, a straight-running lane from a right lane, and a right-turn lane from the right lane.

The route search caused by the route search unit 24 is first performed by searching for a route from a departure location to a destination location using the logic NW data 31. Then, the route search is performed along the searched route in units of lanes. However, even when a plurality of lanes are present at one road, the route search up to the destination location is not performed by designating in which lane the vehicle runs. The route search up to the destination location is performed based on the logic NW data in units of roads. Then, for example, when a right turn is made at the next intersection during a route guide, a lane to run is guided to change it into a lane in which the right turn is possible.

FIG. 3 schematically illustrates a method of navigating this lane change. In FIG. 3, an example in which an exit EX from an expressway RD is provided at the right side of the road is given. On the assumption that a vehicle 40 runs in a driving lane DL, it is assumed that a change into an exit-only lane EL passing through an overtaking lane OL in front of a branch is navigated. The route search using the lane NW data 32 is performed within a fixed range in front of this branch or an intersection. As illustrated in FIG. 3, the lane NW data 32 are stored in a state in which each lane is virtually divided into several portions within the fixed range in front of the branch or the like. For example, there are lanes 1000 to 1004 in the case of the driving lane DL, lanes 2001 to 2004 in the case of the overtaking lane OL, and further lanes 3001 to 3004 in the case of the exit-only lane EL. Then, on the assumption that a change route changed into the neighboring lane is present between these lanes, the lane is preferably changed or guided by any route.

In the example illustrated in FIG. 3, costs from 50 to 100 are given to the routes between the lanes 1000 to 1004 of the driving lane DL and the lanes 2000 to 2004 of the overtaking lane OL. Costs from 60 to 100 are given to the routes between the lanes 2001 to 2004 of the overtaking lane OL and the lanes 3001 to 3004 of the exit-only lane EL. In this example, as the cost becomes lower, the route for the cost indicates a preferred route for the lane change. Therefore, when the vehicle 40 reaches this zone, the route guiding unit 62 guides the lane change along a virtual route for guiding the lane change based on the lane NW data to change the lane in a front side relative to the exit EX. The guide of this lane change will be described below in detail again.

Like when there is an exit, if there is a spot at which setting of attributes related to the lane, such as a lane change restriction lane that is used for reducing a width or only a right turn and a left turn in each lane, is changed, data up to a start point of this setting and data from the start point are made, and the lane NW data are configured from these data. The lane NW data 32 corresponding to the lane are managed by unique lane NW IDs. As illustrated in FIG. 4, each of the lane NW data is assigned to the link data constituting the logic NW data 31 using the lane NW ID.

Further, the lane NW attribute data 35 are associated with the lane NW data 32 managed by the lane NW IDs. As exemplified in FIG. 4, the lane NW attribute data 35 are managed by unique lane NW attribute IDs. A lane NW attribute ID or information about a lane change allowable level, which is used when it is said that both lanes adjacent to the lane are specified, is included in the lane NW attribute data 35.

The lane change data 36 indicating the lane change allowable level are data indicating whether or not the lane change is allowed. The lane change allowable level data 36 can set at least one of a plurality of control levels having different reasons for limiting the lane change. In this embodiment, as the reasons for limiting the lane change, whether or not there are physical obstacles and whether or not there are legal restrictions are distinguished, and one of five control levels from level 1 to level 5 indicated below is selected and set.

Level 1: This indicates that there are physical obstacles, for example a wall or a fence, a guardrail, a delineator and so on, and the lane change (transfer) is physically impossible.

Level 2: This indicates that there are physical obstacles, for example road cones or pole cones, cat's-eyes and so on, and the lane change (transfer) is possible in case of emergency if necessary.

Level 3: This indicates that, although there are no physical obstacles, the lane change (transfer) is impossible for the reason why legal restrictions are, for example, a lane change restriction lane exclusively used for straight running or a solid yellow line is drawn and passing is prohibited.

Level 4: This indicates that there are neither physical obstacles nor legal restrictions, and the lane change (transfer) is possible, but the lane change is not recommended in this section. For example, a lane change into a lane of a merging side in a section where a traffic volume is abnormally heavy or where nearly usual-time congestion occurs, or in a given section just before merging is set to level 4.

Level 5: This indicates that there are neither physical obstacles nor legal restrictions, the lane change (transfer) is possible, and the lane change is recommended in this section.

This control level may include the plurality of control levels having different reasons for limiting the lane change, and control levels caused by reasons other than physical and legal reasons, for example, a difference in a probability of accidents associated with the lane change obtained from analysis of previous accident data. The control level caused by the physical reasons is also not limited to two levels of "presence or absence," and may be divided into three or more levels such as physically unallowable transfer, allowable transfer when a probability of damage to the vehicle is higher than a fixed level like pole cones, allowable transfer when the probability of damage to the vehicle is low like the cat's-eyes. The reasons can also be further subdivided.

The logic NW data 31, the lane NW data 32, the lane NW attribute data 35, the feature data 37, the lane change allowable level data 36 and so on which are described above are prepared based on the real road, and are stored in the memory unit 30 of the server 20. As the information is exchanged with the server 20, the driving information device 50 of the vehicle 40 realizes the lane change guide (to be described below). The method of holding the various data is an example. All the data may be held at the vehicle 40 side, or some thereof may be held at the vehicle 40 side. The data need not be concentrated in one server, and may be distributed to and stored in a plurality of servers. The route search (to be described below) or the like may be performed at the vehicle 40 side in whole or in part. The vehicle 40 may be realized as one lane change support device including the route search or the like.

[Lane Change Guide Process]

Figure 5:
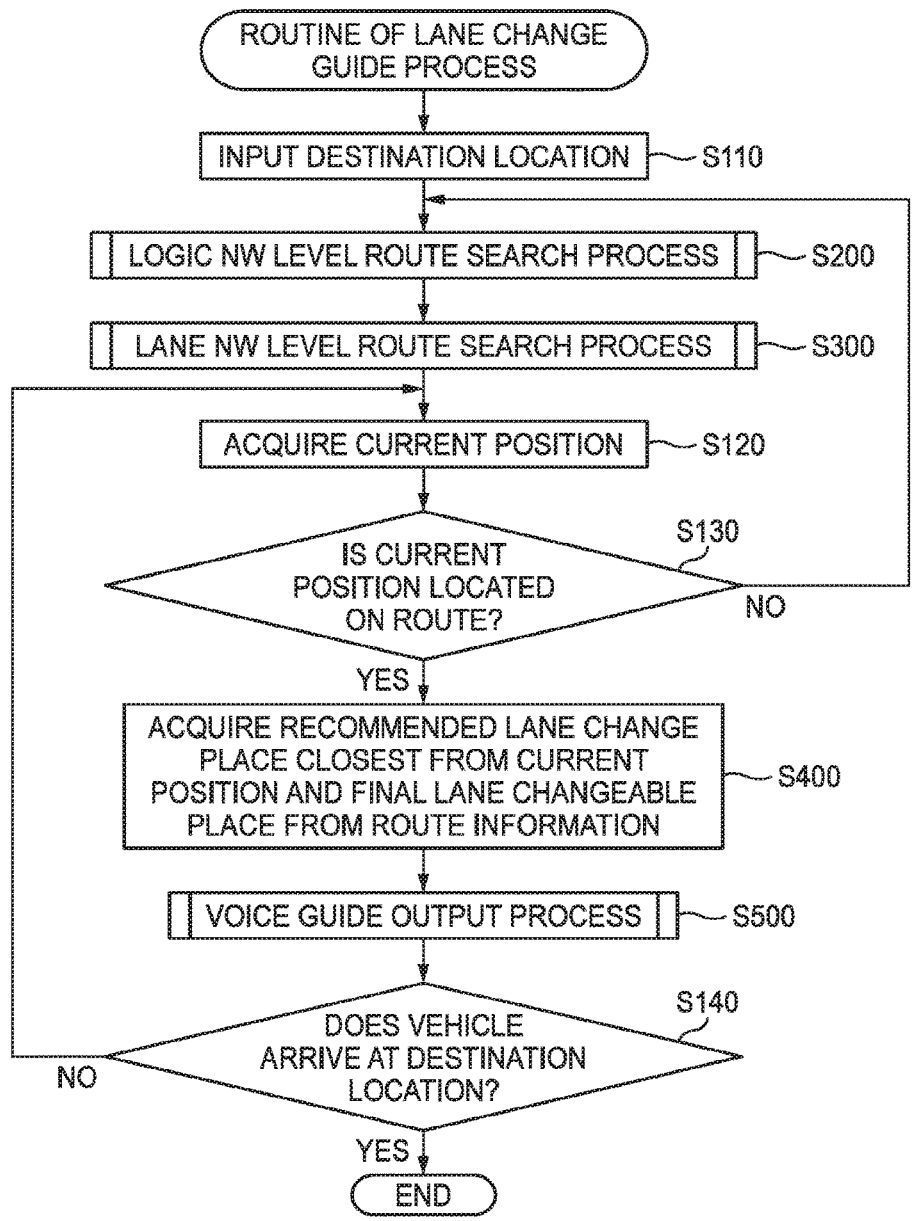
FIG. 5 is a flow chart illustrating a routine of a lane change guide process.

Next, a lane change guide process performed in the aforementioned system configuration will be described. FIG. 5 is a flow chart illustrating a routine of the lane change guide process performed by the lane change support system 10. The driving information device 50 of the vehicle 40 and the server 20 actually exchange necessary information via the network NW, and thereby this process is realized. Separate programs are operated at the driving information device 50 and the server 20, but it is shown as a process of combining both for convenience of description.

When the routine of the lane change guide process is initiated, a process of inputting a destination location is performed first (step S110). The driving information device 50 actually receives input of the destination location from a driver via the input unit 53, and thereby this process is realized. The input of the destination location can be performed by a known method such as retrieval from telephone numbers, input of an address, direct designation of a facility or a place shown on a map, or the like. The information about the input destination location is transmitted from the communication unit 52 to the server 20 via the network NW along with information about a current location that is data of a current position of a vehicle. The information (latitude and longitude) about the current location is specified in real time by the position specifying unit 61 based on information from the position acquisition unit 56 installed in the vehicle 40.

Figure 6:
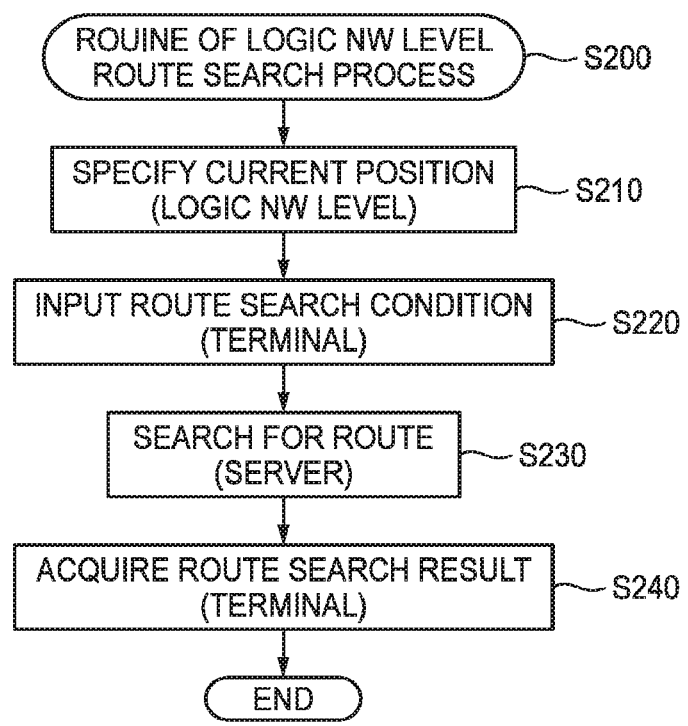
FIG. 6 is a flow chart illustrating a routine of a route search process to a road NW level.

The server 20 receiving the information about the destination location and the current location performs a route search process to a logic NW level using the route search unit 24 (step S200). An example of this route search process (step S200) is illustrated in FIG. 6. When a routine of the route search process to this logic NW level is initiated, a process of specifying the current location of the vehicle 40 to the logic NW level is performed first (step S210). The information about the current location is transmitted from the vehicle 40, but the current position is specified to the logic NW level based on the information about the latitude and the longitude.

Subsequently, if there are conditions of the route search, these are input from a terminal, namely the driving information device 50 of the vehicle 40 (step S220). The conditions of the route search are, for example, availability of an expressway, designation of a via location, and so on. Naturally, when default conditions are used, it is not necessary to receive particularly designation from the vehicle 40 side. Designation of search conditions may be adopted to be received from the vehicle 40 side as a whole along with the information about the destination location and the current location.

When the designation of the information is completed with respect to the conditions of the destination location, the current location, and the route search, the server 20 performs the route search process using the route search unit 24 (step S230). Since the route search method using the logic NW data 31 is known, description thereof will be omitted. When the route search is completed, the server 20 transmits a result of the route search to the vehicle 40 side via the network NW. The result of the route search is acquired at the vehicle 40 side (step S240). The acquired result of the route search is used for route guide of the route guiding unit 62 in the vehicle 40. The route guide is performed, for example, at the output unit 54 of the vehicle 40 by combining and updating display of a recommended route overlapped on a map with running of the vehicle 40.

In this way, when the route search to the logic NW level is completed, then the route search process to the lane NW level is conducted (step S300). This process is also continuously performed by the route search unit 24 of the server 20. The route search to the lane NW level is a process of searching for a lane in which the vehicle 40 should run on a road on which the vehicle 40 should run, and specifying the lane to run. To be specific, the route search is to specify a lane which the vehicle 40 should take in advance in preparation for a left or right turn at an intersection, entry to a branch road or an exit at high speed, a reduction in width, and so on.

Figure 7:
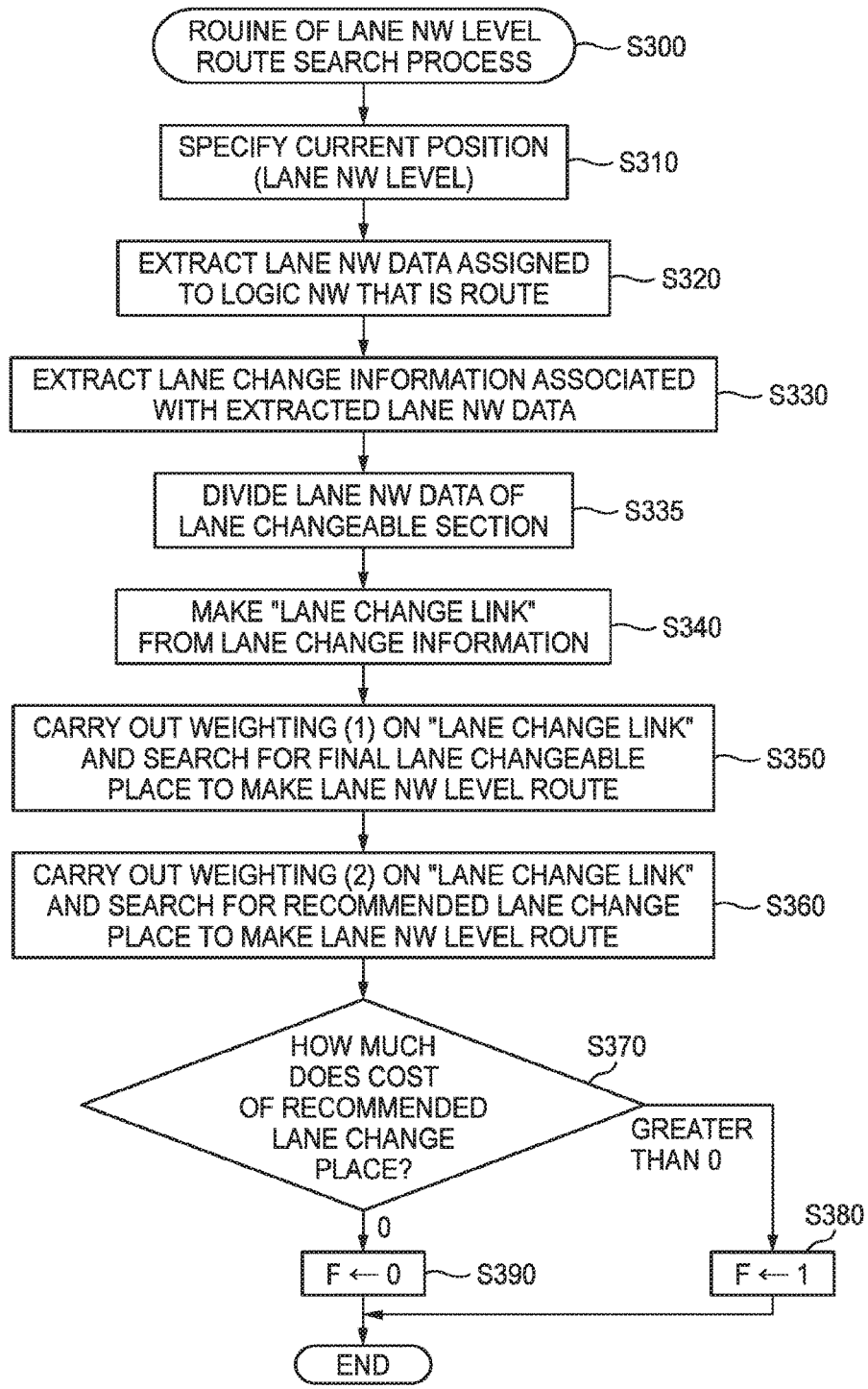
FIG. 7 is a flow chart illustrating a routine of the route search process to a lane NW level.

An example of the route search process to this lane NW level is illustrated in FIG. 7. When a routine of the route search process to this lane NW level is initiated, a current location to the lane NW level is specified first (step S310). In short, it is specified in which lane the vehicle runs. Subsequently, lane NW data assigned to a route specified by the logic NW level are extracted (step S320). As illustrated in FIGS. 3 and 4, the lane NW data 32 corresponding to a current position during running is taken from the memory unit 30.

Subsequently, a process of extracting lane change information associated with this from the extracted lane NW data 32 is performed (step S330). The information about the lane change is extracted from the lane NW attribute data 35. To be specific, a lane in which the vehicle 40 runs at present and a lane to run ahead are specified. To make a description of FIG. 3 by way of example, when the vehicle 40 runs in a driving lane DL at present and is adopted to be changed into an exit-only lane EL ahead, the information about the lane change from the driving lane DL into the exit-only lane EL via an overtaking lane OL is extracted by referring to the lane NW attribute data 35. If the vehicle 40 runs in the overtaking lane OL at present, the information about the lane change from the overtaking lane OL into the exit-only lane EL is extracted by referring to the lane NW attribute data 35. As illustrated in FIG. 4, since information or the like indicating whether a right or left lane is present at each lane, a lane NW ID for specifying the lane that is present, and a lane change allowable level is stored in the lane NW attribute data 35, if the lane in which the vehicle 40 runs at present is specified, lane change information associated with this can be easily extracted.

Figure 8A:
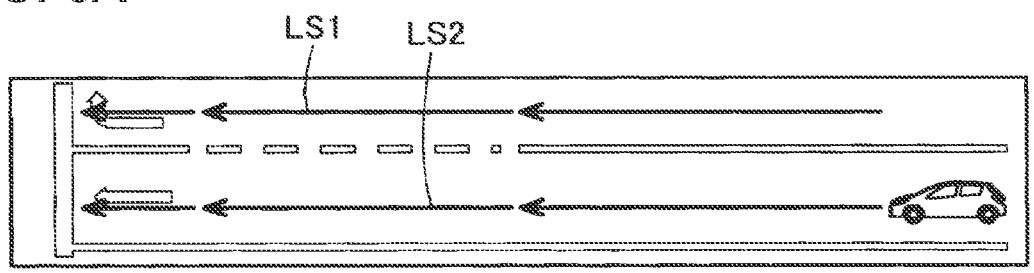
FIGS. 8A to 8C are schematic diagrams illustrating a mode for dividing a lane NW in a lane changeable section.
Figure 8B:
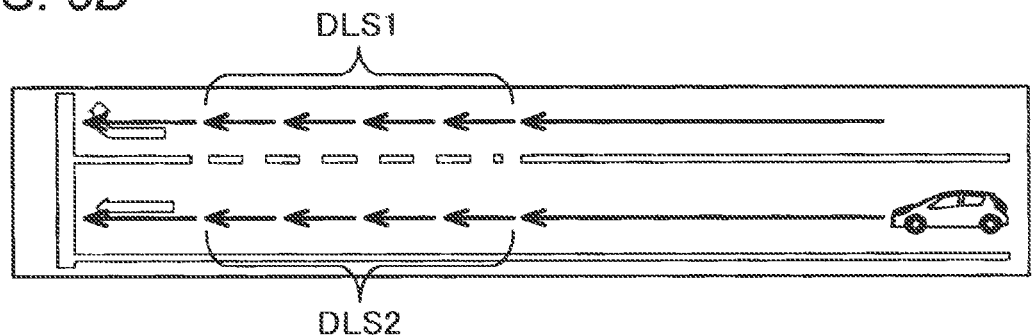
Figure 8C:
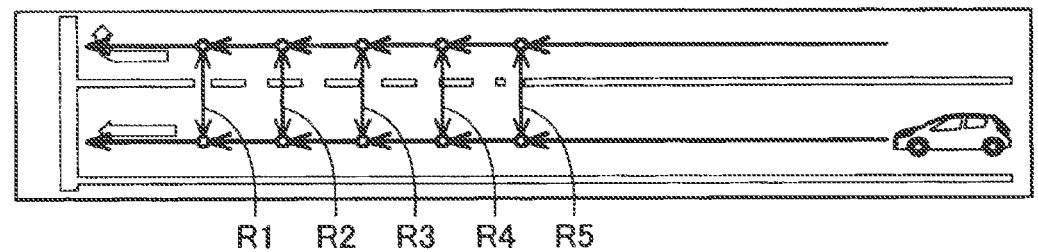

Since a range in which the lane change is possible is recognized from the lane change information obtained in this way, the next process of dividing the lane NW data of a lane changeable section is performed (step S335), and a process of making lane change links using the divided lane NW data is performed (step S340). This situation is illustrated in FIGS. 8A to 8C. FIGS. 8A to 8C are schematic diagrams illustrating a situation in which a lane NW is divided in a lane changeable section. As illustrated in FIG. 8A, a lane changeable range acting as the lane change information is obtained as lane data LS1 and LS2 included in the lane NW data 32 by the process of step S330. Accordingly, as illustrated in FIG. 8B, the lane data LS1 and LS2 are divided into a plurality of sections next. The division is performed such that each of the divided sections has a given length. For example, if the lane data LS1 and LS2 are 200 meters, they are divided into four 50 meter sections. In FIG. 8B, sets of the divided sections are illustrated as symbols DLS1 and DLS2.

The divided lane data obtained in this way are connected to make lane change links as illustrated in FIG. 8C (step S340). As illustrated in FIG. 8C, the lane change links are a set of route candidates for the lane change virtually made between the lanes. In the logic NW data corresponding to the road, the links are joined by a node such as an intersection that is present in reality. However, in the lane change, a lane change point acting as a real feature like the intersection is not present. For this reason, to guide the lane change, virtual lane change links are made. These lane change links are virtual links in the sense that they do not correspond to the real intersection or the like. However, as illustrated in FIG. 4, each link itself in each lane constituting the lane change links is prepared for each place to guide the lance change in front of the intersection or in front of the branch or the exit of the expressway in advance. The lane change links are made by reading necessary links based on a current position of the vehicle 40 (a driving lane or a running position on the lane) and combining the necessary links.

When these lane change links are made, flexible countermeasure is performed using the lane change allowable level data 36 illustrated in FIG. 4 in the present embodiment. For example, in the present embodiment, it is determined whether the lane change links are made based on designation of a driver which is input from the input unit 53 of the driving information device 50 of the vehicle 40 including or not including a section of level 4 that does not recommend the lane change from the viewpoint of the traffic volume although there is no legal restrictions. The lane change links are made under any condition based on the input from the input unit 53.

Figure 9:
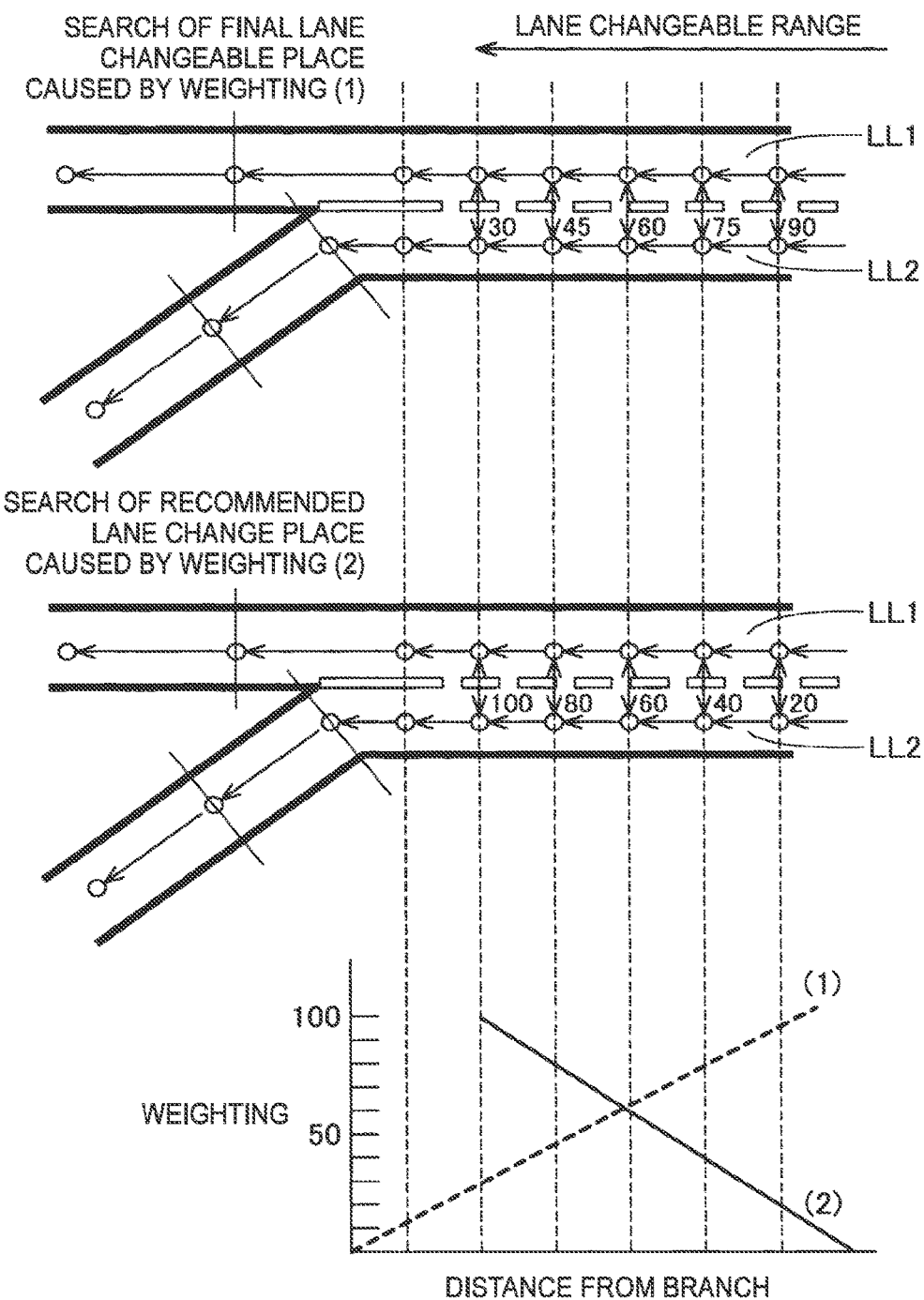
FIG. 9 is an illustrative diagram illustrating a mode for searching for final lane changeable place and a recommended lane change place using weighting.

Weighting (1) is carried out on the lane change links made in this way, searching for a final lane changeable place to make a lane NW level route (step S350). Further, weighting (2) is carried out on the lane change links made in this way, searching for a recommended lane change place to make a lane NW level route (step S360). These two processes will be described with reference to FIG. 9. FIG. 9 is an explanatory diagram assuming a case in which the vehicle 40 arrives in front of a place where a branch is present. In an example illustrated in FIG. 9, there are a lane LL1 running straightly with respect to a branch and a lane LL2 branching off to the left. The lane change links are made in conjunction with these two lanes by the process of step S340. In FIG. 9, arrow lines are links in the lane NW data, and "O" marks indicate points at which these links are connected.

The lane change links are made in a lane changeable range in lane NW attribute information. Afterwards, the weighting (1) is applied to the lane change links. As the weightings (1) and (2), values illustrated in the bottom section of FIG. 9 are preset. These values are set according to a distance from the branch. As the distance from the branch increases, the weighting (1) is set to increase, and the values thereof range from 0 to 100. When this weighting (1) is applied to the lane change links (step S350), values from 30 to 90 are given to the links of the lane change as in the top section of FIG. 9. A place of the link to which the smallest value is given in the lane change links is searched as the final lane changeable place. As an area where this final lane changeable place occurs, various locations such as an entrance location of the intersection, a branch location in the branch, a width reduction location where the width is reduced, and so on are assumed.

Afterwards, the weighting (2) is applied using the final lane changeable place as a terminal end this time. This result is illustrated in the medium section of FIG. 9. In this example, a value of 100 is given to the link of the lane change at the final lane changeable place, and a value reduced in proportion to the distance separated from the branch is given.

In this way, applying the weightings (1) and (2) to the lane change link is intended to flexibly cope with temporary limitation of the lane change or the like caused by condition on which the lane change is possible on the real road, for example a change in legal restrictions or construction. Due to the same method of forming the lane change links in the lane changeable range using the lane NW attribute information and applying the weighting (1) to these, it is possible to be easily aware of the final lane changeable place. Further, as the weighting (2) is applied from the final lane changeable place obtained in this way, it is possible to easily determine a point at which the lane change is recommended within the lane change links. Data of these weightings (1) and (2) are stored in the memory unit 30 as the recommended level data 39.

Figure 10A:
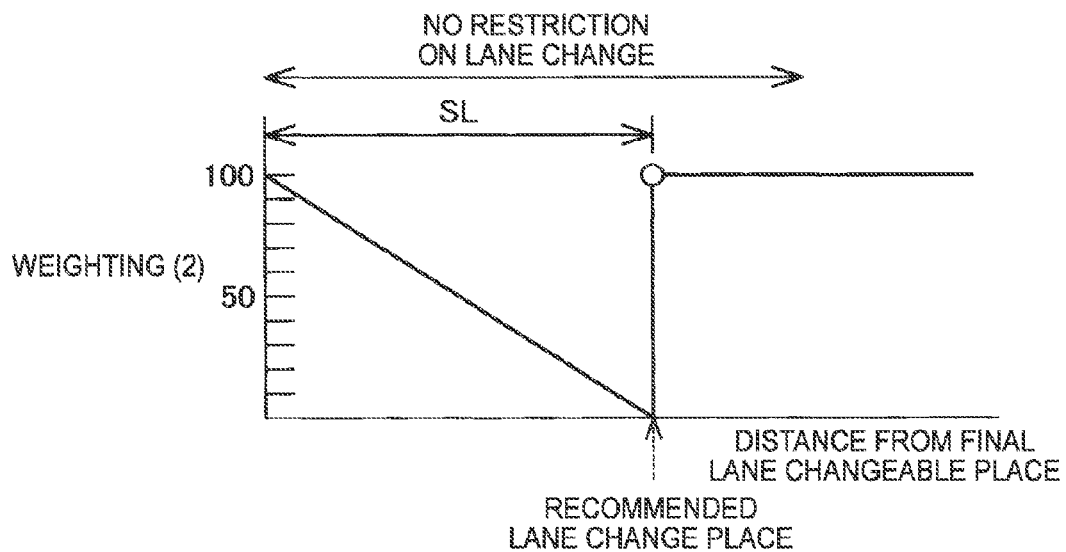
FIGS. 10A and 10B are graphs illustrating a relation between a distance from the final lane changeable place and the weighting.
Figure 10B:
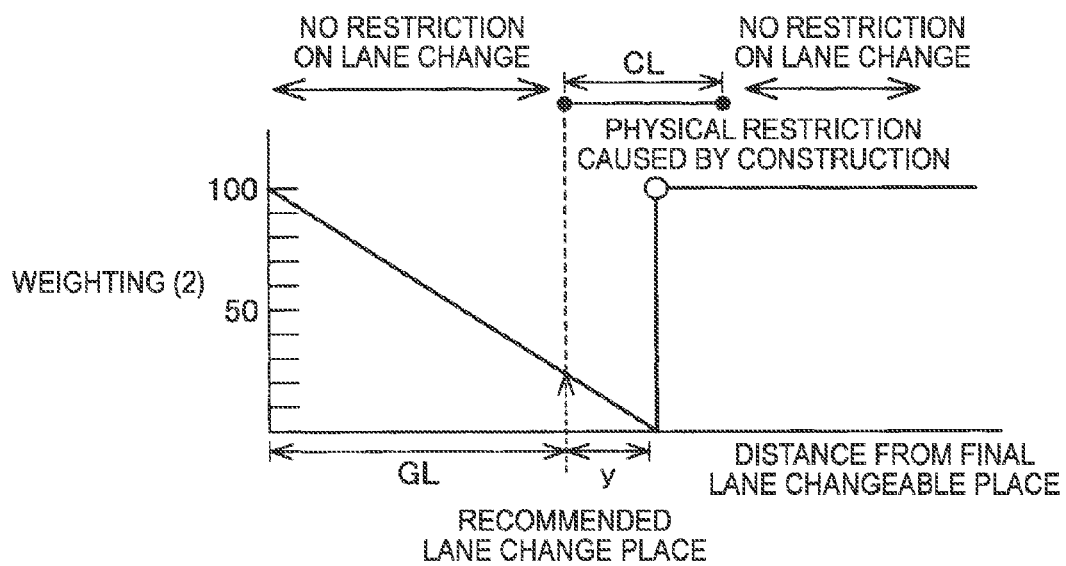

The final lane changeable place and the recommended lane change place will be further described using FIGS. 9 to 10B. FIG. 9 is a graph illustrating an example of the weighting (2). This weighting (2) shows a relation between the distance from the final lane changeable place and the weighting (2). If there are no restrictions on the lane change, the lane change links indicate areas where the guide of the lane change is suitable for the lane change, namely should recommend the lane change as much as they are separated from the final lane changeable place. Even in this case, the lane change is by no means preferably recommended at a location that is too separated from the final lane changeable place. For this reason, the weighting (2) is reduced in proportion to the distance separated from the final lane changeable place and becomes a value of 0, namely is set to a value of 100 in a range that further falls away from an area separated from the final lane changeable place by a distance SL.

However, the lane changeable range may be completed prior to being temporarily separated from the final lane changeable place by the distance SL. FIGS. 10A and 10B exemplify this case. In an example illustrated in FIGS. 10A and 10B, it is shown that physical restrictions caused by construction are imposed throughout a given range CL prior to being separated from the final lane changeable place by the distance SL and the lane change can be temporarily performed in this range.

Accordingly, if the weighting (2) is applied to the lane change links by the process of step S360 of FIG. 7, when the lane changeable range from the final lane changeable place is sufficiently present as in FIG. 9, the values (the costs for the route search) from maximum 100 to minimum 0 are adopted to be given to the lane change links. On the other hand, as in FIGS. 10A and 10B, when the lane changeable range from the final lane changeable place is not sufficient, the minimum value of the values given to the lane change links does not become zero (0).

Therefore, in a routine of a lane NW level route search process illustrated in FIG. 7, it is discriminated next how much a cost of the recommended lane change place is (step S370). Since the recommended lane change place is a place where the minimum value is applied among the lane change links, it becomes a value of 0 in the example of FIG. 9 and a value greater than the value of 0 in the example of FIGS. 10A and 10B. That is, if the cost of the recommended lane change place becomes the value of 0, the lane changeable section becomes relatively short. Therefore, when the cost of the recommended lane change place is greater than the value of 0, a lane change section short flag F (hereinafter referred to simply as "flag F") indicating that the lane change is short is set to a value of 1 (step S380). When the cost is the value of 0, the flag F is set to the value of 0 (step S390). As mentioned above, the routine of the lane NW level route search process is terminated. Afterwards, the process returns to FIG. 5, and the following process is continued.

When the lane NW level route search process (step S300) is terminated, then the current position of the vehicle 40 is acquired (step S120). Since the current position of the vehicle 40 is acquired in real time by the position acquisition unit 56 mounted in the vehicle 40, the current position is acquired from the vehicle 40 side via the network NW. Afterwards, it is determined whether or not the acquired current location of the vehicle 40 is present on the route searched by the route search process (step S200) to the logic NW level (step S130).

If the current position of the vehicle 40 is not present on the searched route, the process returns to step S200, and the aforementioned processes are repeated from the route search process to the logic NW level from the current position to the destination location. As this process is performed, if it is determined that the current position of the vehicle 40 is present on the searched route (step S130), then a recommended lane change place and a final lane changeable place which are closest from the current position of the vehicle 40 are acquired based on route information (step S400). The recommended lane change place and the final lane changeable place which are acquired here are the places searched by steps S350 and S360 of the lane NW level route search process (FIG. 7), namely a recommended lane change place and a final lane changeable place that are closest in a traveling direction on the route to the lane NW level. Since the vehicle 40 runs, if this recommended lane change place is acquired as an area having a cost of 0 as described using FIG. 9, it may also be acquired as an area other than the area having the cost of 0 as described using FIGS. 10A and 10B.

In this way, after the recommended lane change place and the final lane changeable place are acquired, a voice guide output process (to be described below) (step S500) is performed. Afterwards, it is determined whether to reach the destination location (step S140). If the vehicle does not reach the destination location, the process returns to step S120 described above, and the processes are repeated. If the vehicle reaches the destination location (step S140), the lane change guide process is not required more than this, and thus leads to "END." The routine of the lane change guide process is terminated.

Figure 11:
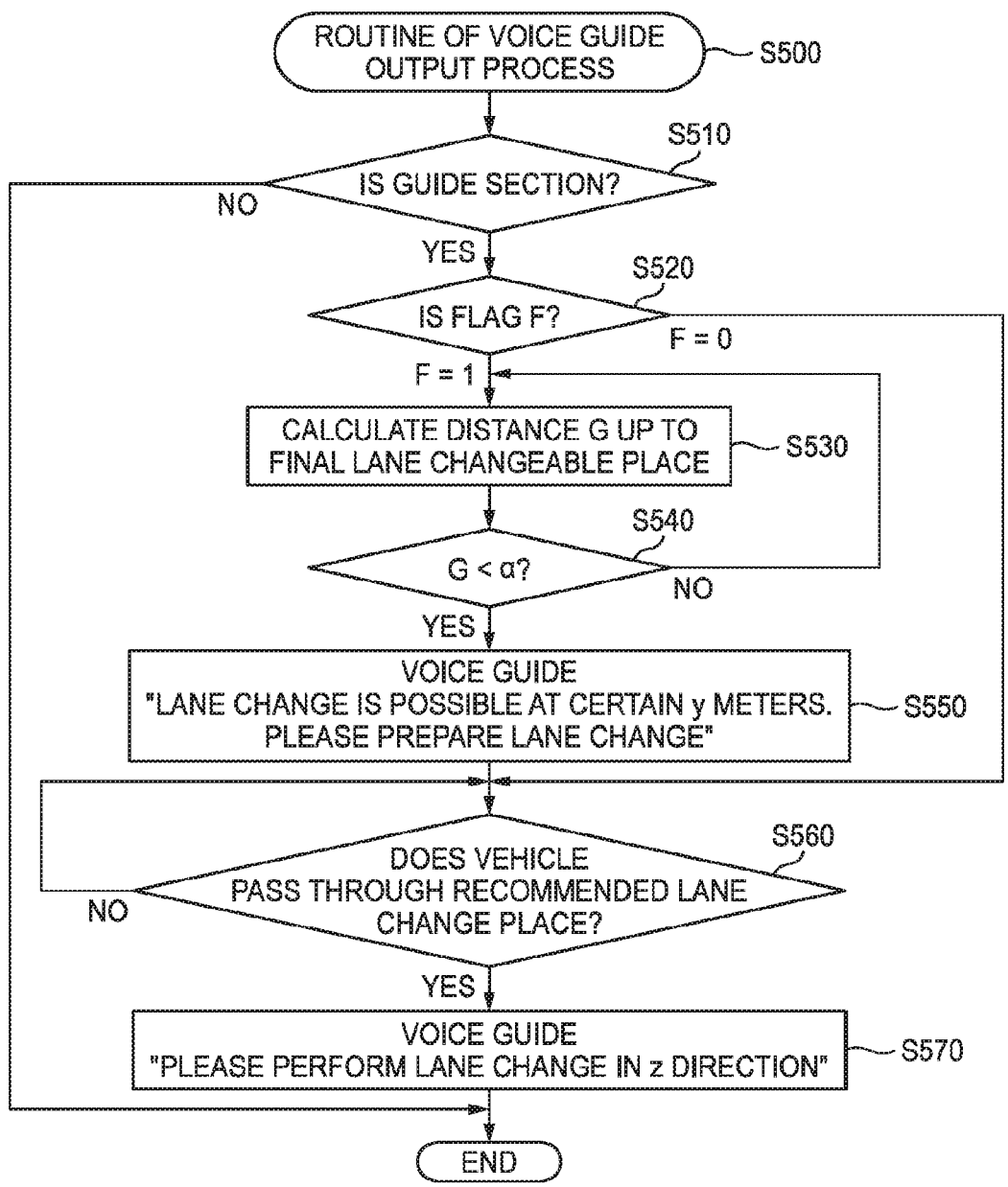
FIG. 11 is a flow chart illustrating a routine of a voice guide output process.

Contents of the voice guide output process at step S500 will be described using FIG. 11. A routine of this voice guide output process is processed at the vehicle 40 side. Prior to this process, the lane change recommended place extracting unit 63 of the navigation control unit 60 receives data from the server 20, and extracts the final lane changeable place and the recommended lane change place. When the routine of the voice guide process illustrated in FIG. 11 is initiated, it is determined first whether to be a guide section (step S510). If the guide section is distantly separated from the section to perform the lane change, this is because there is no need to perform the guide of the lane change. This case ("NO" of step S510) leads to "END" without performing anything. The routine of the voice guide output process is terminated for the present.

When the vehicle 40 approaches the section to perform the lane change such as the intersection or the branch, it is determined that the section enters the guide section ("YES" of step S510). Next, a value of the flag F is discriminated (step S520). As described above, this flag F indicates whether or not the lane changeable section is short. Therefore, if the value of this flag F is discriminated and the flag F is a value of 1, there is a possibility of the lane changeable section being short, and a distance G from the current position of the vehicle 40 to the final lane changeable place is calculated first (step S530). It is not until this distance G is smaller than a predetermined given value α that the calculation of the distance G (step S530) and comparison with the given value α (step S540) are repeated. Here, the given value α is set to GL+y meters. In the present embodiment, GL is a "distance from the final lane changeable place to the recommended lane change place" as illustrated in FIGS. 10A and 10B, and y is a predetermined value, for example 50. α may be set to a fixed value regardless of the distance GL.

When the position of the vehicle 40 is shorter than the GL+y meters from the final lane changeable place (G<α at step S540), a guide of "The lane change is possible at y more meters. Please prepare the lane change" is output by a voice (step S550). This guide caused by the voice is performed at the vehicle 40 side in the present embodiment. However, this guide may be realized by transmitting an instruction from the server 20 to the driving information device 50 of the vehicle 40 via the network NW. The voice for the voice guide may be output by voice synthesis by the output unit 54 of the vehicle 40, or voice data may be adopted to be transmitted from the server 20 side to the vehicle 40, and be reproduced by the output unit 54.

This voice guide is performed to urge preparation upon a driver because there is a possibility of the flag F having the value of 1, namely the lane changeable section being short. Accordingly, when it is determined at step S520 that flag F=0, the aforementioned processes of steps S530 to S550 are not performed as being unnecessary.

Next, it is determined based on the current position of the vehicle 40 whether or not the vehicle 40 passes through a recommended lane change position, which is repeated until the vehicle passes through the recommended lane change place (step S560). If it is determined that the vehicle 40 passes through the recommended lane change place, a voice guide of "Please perform the lane change in a z direction." is performed (step S570). The z direction is a direction following the lane change links made by the route search process (FIG. 7) to the lane NW level. In the example illustrated in FIGS. 10A and 10B, if the vehicle running in the right lane LL1 branches off to the left, z is the "left." In the reverse case, z is the "right." This process may also be realized by outputting the instruction from the server 20 to the driving information device 50 of the vehicle 40. After this voice guide is performed, the process leads to "END." A routine of this process is terminated.

The lane change guide process described above is repetitively performed until the vehicle 40 arrives at the destination location. For this reason, when the driver of this vehicle 40 receives a typical route guide until the vehicle 40 arrives at the destination location and approaches the place where the lane change is necessary, the driver can receive the voice guide of the lane change in a necessary direction at a preset proper position (at a recommended lane change place). For this reason, in the route guide, in comparison with a case in which a guide of "There is the lane change restriction lane exclusively used for the right turn ahead." is simply received or a case in which a guide of "Please branch off to the left at 00 meters ahead." is received, an own vehicle can undergo the lane change into a proper lane in advance, or driving convenience or running safety can be improved.

However, in the present embodiment, as illustrated in FIG. 4, the lane change allowable level data indicating whether or not the lane change is allowed can be distinguished by the presence or absence of the physical obstacles and the presence or absence of the legal restrictions, and can be set to the five levels from level 1 to level 5. Afterwards, in the present embodiment, it can be set by a driver whether to include the section of level 4 in the lane change links. To be specific, when the lane change links are made (step S340 of FIG. 7), it can be set up to which level the lane change allowable level data are used. For this reason, the guide of the lane change can be performed in a proper range according to an intent of the driver.

Further, in the present embodiment, after the lane change links are made, the two types of weightings (1) and (2) are carried out on these, and thereby the recommended lane change place and the final lane changeable place are specified. Accordingly, the guide of the lane change is not uniformly performed on the place where the lane change is necessary, and a flexible guide corresponding to a situation of the place where the lane change is necessary is possible. For example, in the present embodiment, when the distance from the recommended lane change place to the final lane changeable place is short, the driver can be previously urged to make preparation for the lane change, and perform the lane change in good time. For this reason, from the standpoint of the vehicle driving, convenience and safety can be further improved. This countermeasure is particularly useful to an inexperienced driver who requires the guide to a high degree. The previous guide may not be performed.

Moreover, in the present embodiment, as illustrated in FIG. 4, the lane NW attribute data 35 are assigned to the lane NW data 32, and further the lane change allowable level data 36 are assigned to the lane NW attribute data 35. For this reason, it is minutely set based on the physical situations and the legal restrictions whether or not the lane change is allowed, so that the guide of the lane change can be performed.

Modifications of the First Embodiment

Several modifications of the lane change support system 10 of the first embodiment will be described. The relation between the distance from the final lane changeable place and the cost (the weighting) of the lane change may be changed by various conditions. For example, as illustrated in FIG. 12, a lane change as wide as one lane may be adopted to use a relation indicated by a solid line Ja, and a case in which a lane change as wide as two lanes is performed may be adopted to use a relation indicated by a broken line Ba.

To perform the lane change on two lanes, a farther distance than the lane change of one lane is required. For this reason, the relation Ba is set such that the distance from the final lane changeable place where the cost becomes the value of 0 is distant compared to the case Ja of the lane change of the first-order segment. The relation between the distance from the final lane changeable place and the weighting need not to be linear, and can be arbitrarily set to a polygonal line or a quadratic curve. Sine a mental burden increases toward a location (a final lane changeable place) at which the lane change is not allowed, weighting of an area separated from the final lane changeable place is preferably adopted to have a relation set to a lower cost.

Figure 12:
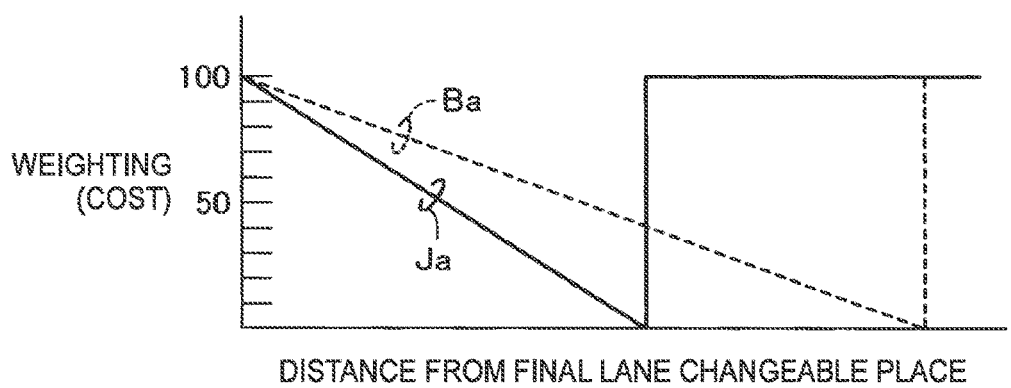
FIG. 12 is a graph illustrating an example in which the relation between a distance from the final lane changeable place and the weighting is changed.

The two relations Ja and Ba illustrated in FIG. 12 can be associated with a relation other than the number of times of the lane change. For example, according to a speed of the vehicle 40 that is running, the relation Ja is used at a speed of 90 km/h or less, for example, on a expressway. When the speed exceeds the speed of 90 km/h, the relation Ba may be adopted to be used. This is because, if the vehicle speed is high, this preferably guides the lane change from the front compared to when the vehicle speed is low. Alternatively, the vehicle speed may be switched by a preference of a driver which is input by the input unit 53. This is because there is a person who wants to guide the lane change early, whereas there is a person who does not want to perform the lane change too early. According to whether or not the driver is an inexperienced person, the vehicle speed may be changed. The inexperienced person is adopted to use the relation Ba to enable the lane change in good time. Information about the inexperienced person may be input from the input unit 53, or may be estimated from a driving pattern. Further, the case of an expressway may be adopted to use the relation Ba, and the case of a general road may be adopted to use the relation Ja.

In the first embodiment, the image acquired by the image acquisition unit 70 may be used. To use the image acquired by the image acquisition unit 70, for example, the following can be considered.

(A) The image is used to accurately determine the current position of the vehicle 40. As one of the feature data 37 preliminarily stored as data of a feature around a road, image data of the feature is preserved, and is compared with the image acquired by the image acquisition unit 70 during running of the vehicle 40. Thereby, the position of the vehicle 40 can be accurately recognized. In this case, the image acquisition unit 70 functions as a feature information acquisition unit. Thus, in a case in which the current position of the vehicle 40 is acquired by the position acquisition unit 56 using GNSS or the like, even when accuracy of position information is subjected to restriction of the GNSS, recognition of an accurate position is possible. Thereby, a position data correction unit can be realized. When the accuracy of position information is subjected to restriction of the GNSS, it can be considered, for example, that the positional accuracy of the vehicle is temporarily insufficient, for example, on an expressway between high-rise buildings depending on a radio wave state.

(B) Situations around the vehicle 40 are recognized and used to guide the lane change. When surroundings of the vehicle 40 are image-captured by the image acquisition unit 70 and another vehicle that is a target is present, for example, at an obliquely rear side of the vehicle 40, this can be reflected on the guide of the lane change in that direction. As the way of reflecting, various countermeasures, such as a method of calling attention to the presence of the vehicle like "Please pay attention to the vehicle at the obliquely rear side and perform the lane change in a z direction," or a method of delaying the guide of the lane change until there is no vehicle at the obliquely rear side, are possible.

(C) Lane lines or the like are image-captured and compared with the feature data 37. The legal restrictions on each lane are previously examined and reflected on the lane change allowable level data 36. However, the lane lines corresponding to these restrictions are drawn on each road. When the lane line rather than the center line is yellow, since passing from the lane is prohibited, the lane change into the yellow lane line side is not allowed. Therefore, the lane lines may be image-captured by the image acquisition unit 70, and be reflected on the lane change allowable level data on the spot to guide the lane change. Imposing these restrictions is reflected on the lane change allowable level data 36 in principle. However, mismatch may be generated by an error of data or timings of a change in restrictions and data updating. Although this mismatch is generated, it can be corrected by the image acquired by the image acquisition unit 70.

In the aforementioned embodiment, the guide caused by the voice is performed by urging the preparation of the lane change (step S550 of FIG. 11) and guiding the lane change (step S570), but only either one is sufficient. Alternatively, if the lane change is not yet performed at a point in time when the vehicle passes through the final lane changeable place, a guide prohibiting the lane change such as "The lane change is not allowed from here" or "Please follow the next route guide because the lane change is not allowed" may be performed. When the lane change is guided, it may be guided including a degree of recommending the change. The degree of the recommendation is to reflect a degree to be recommended such as "It is most preferable to perform the lane change at this position," "Please perform the lane change here when possible," or the like. All of these guides need not be performed, and one thereof or a combination of two or more thereof may be performed.

In the aforementioned embodiment, the guide of the lane change is performed by the voice using the output unit 54, but it need not be essentially performed by the voice, and may be a guide that is displayed on the display panel provided for the output unit 54. A guide that is reflected onto the front windshield, overlaps with a real image beyond the front windshield with respect to the driver, and recommends a direction or the like of the lane change may be displayed. Alternatively, the lane change may be guided by a method of selectively vibrating the right or left side of a steering wheel.

Second Embodiment

Figure 13:
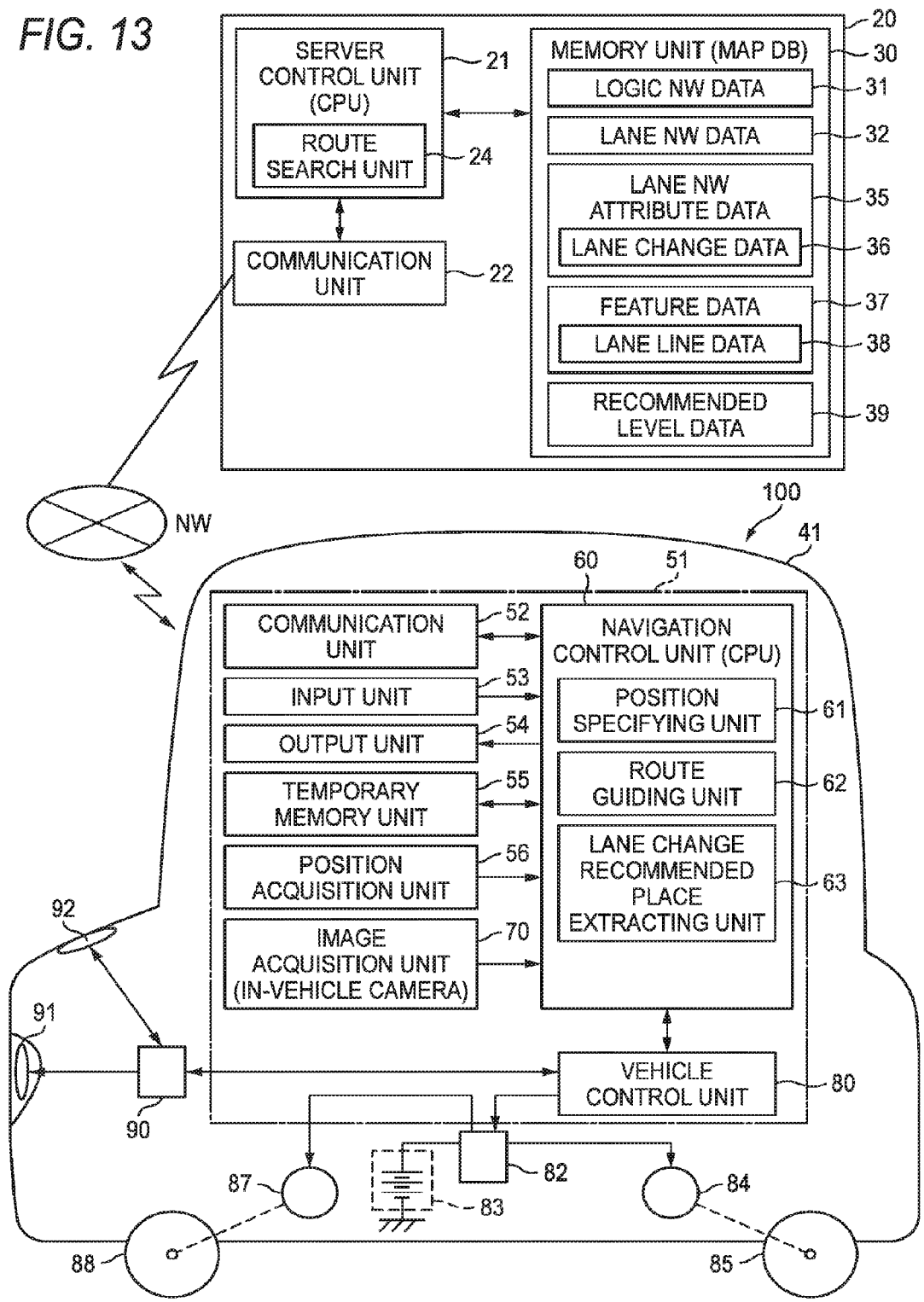
FIG. 13 is a schematic configuration diagram illustrating a schematic configuration of a lane change driving control system as a second embodiment.

Next, a second embodiment of the disclosure will be described. FIG. 13 is a schematic configuration diagram of a vehicle control system 100 as a second embodiment. This vehicle control system 100 is different in configuration of a vehicle 41, compared to the lane change support system 10 of the first embodiment. A server 20 has the same configuration as in the first embodiment.

As illustrated in FIG. 13, the vehicle 41 constituting the vehicle control system 100 is provided with a driving control device 51 in place of the driving information device 50. This driving control device 51 is further provided with a vehicle control unit 80 in addition to the communication unit 52 to the image acquisition unit 70 with which the driving information device 50 of the first embodiment is provided. In this embodiment, the driving control device 51 has a function as a determination unit that determines whether or not a lane change is allowed. The vehicle control unit 80 is connected to a motor driving unit 82 or an accessory driving unit 90 that is mounted in the vehicle 41. The motor driving unit 82 is connected to a battery 83. The motor driving unit 82 receives an instruction of the vehicle control unit 80, and drives a running motor 84 for vehicle running and a steering motor 87 for steering by means of electric energy stored in a battery 83. The running motor 84 is coupled to driving wheels 85 that are rear wheels. As the number of revolutions and torque of the running motor 84 are controlled, the vehicle 41 functions as an electric vehicle in which a start, running, a stop, and so on are allowed. The steering motor 87 is coupled to a steering shaft (not illustrated) for front wheels 88. As the steering motor 87 is driven, angles of the front wheels 88 relative to a vehicle longitudinal axis are variable, and the vehicle can be freely changed in a running direction.

The accessory driving unit 90 drives accessories mounted in the vehicle 41 and collects information from the accessories. In FIG. 13, the accessories include a light group 91 such as headlights or winkers and a millimeter-wave radar 92 functioning as one of detection units by way of example. The vehicle 41 automatically turns on the headlights when it gets dark and turns on and off the winkers at a side intended for a turn in the event of a right or left turn or a lane change by means of the vehicle control unit 80 of the driving control device 51. A signal from the millimeter-wave radar 92 is read via the accessory driving unit 90, and objects around the vehicle 41 are detected. In addition to the hardware configurations illustrated in FIG. 13, necessary devices required to run on a road as a vehicle, for example, a brake system, various indicators, and so on, are mounted in the vehicle 41, but description thereof will be omitted.

Figure 14:
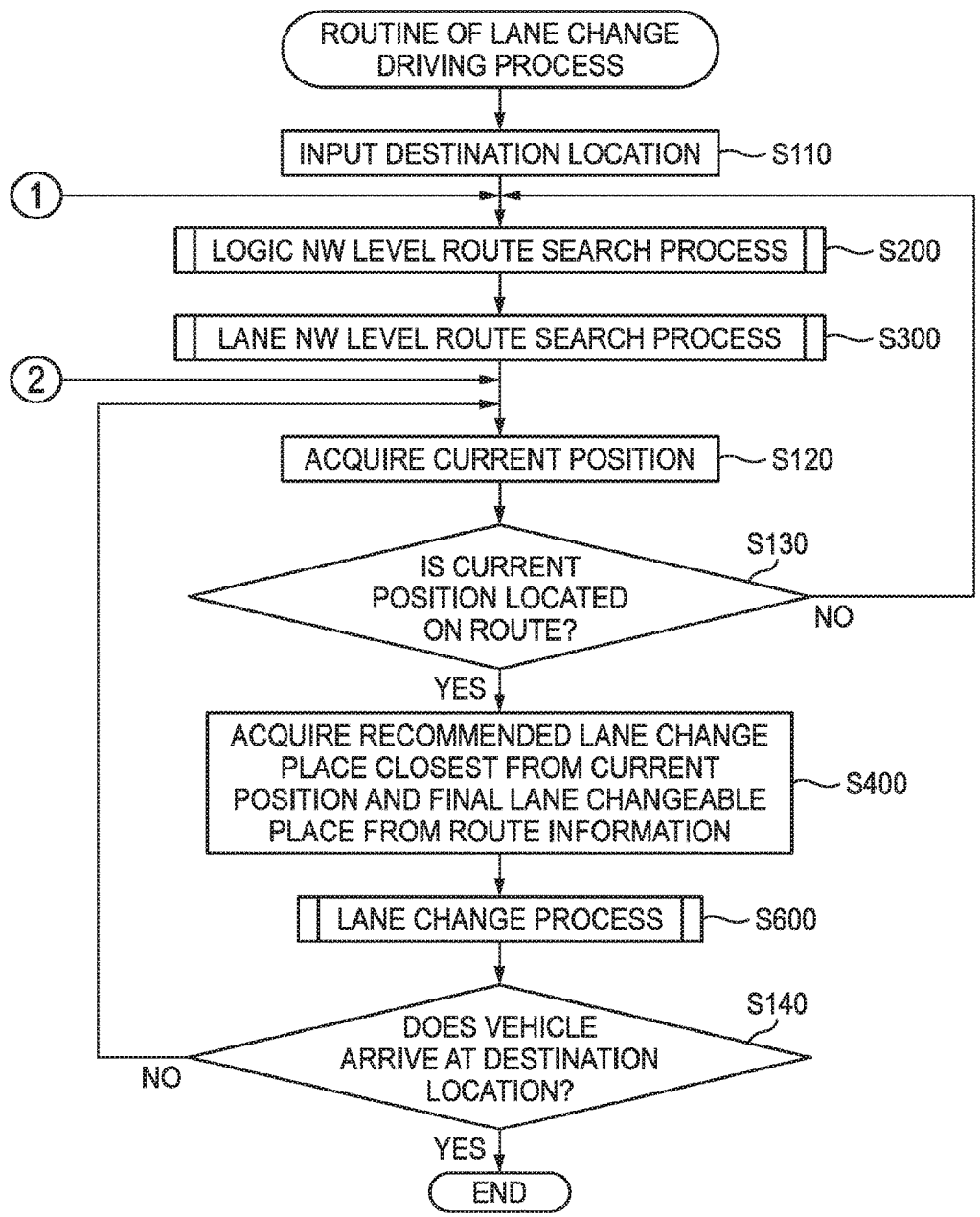
FIG. 14 is a flow chart illustrating a routine of a lane change driving process.

Next, a routine of a lane change driving process performed using the vehicle control system 100 will be described. Like the first embodiment, the routine of the lane change driving process of the second embodiment realizes a lane change driving process illustrated in FIG. 14 in cooperation with the server 20 and the driving control device 51 of the vehicle 41. This process is the same as another process, except that the routine of the lane change guide process illustrated in FIG. 5 performs a lane change process (step S600) in place of a voice guide output process of step S500. Accordingly, in addition of a process of inputting a destination location (step S110), description of processes of step S200, S300, S120, S130, S400, and S140 will be described.

Figure 15:
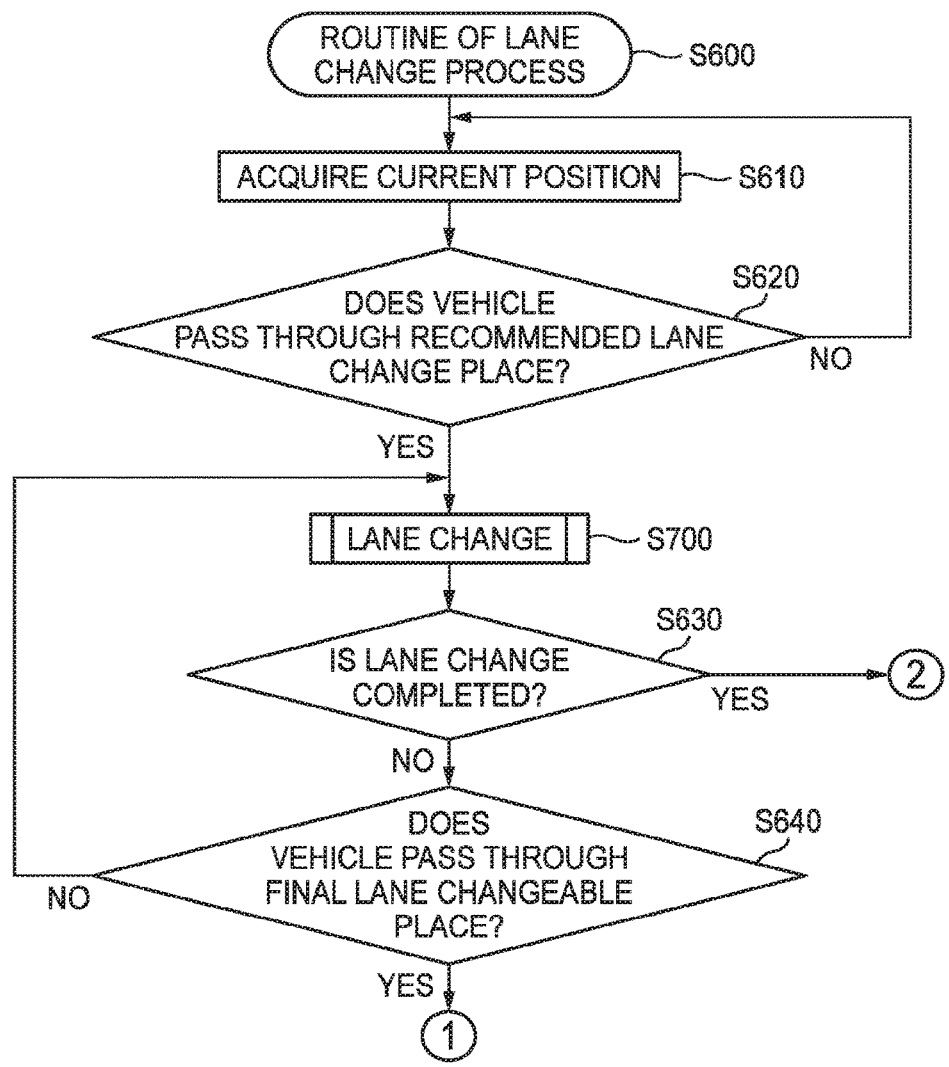
FIG. 15 is a flow chart illustrating a routine of a lane change process.

The lane change process (step S 600) will be described with reference to FIG. 15. The vehicle 41 is subjected to automated driving based on the input of the destination location (step S110 of FIG. 14) and a route search associated with this as the assumption that the process illustrated in FIG. 15 is performed. As the vehicle control unit 80 drives the running motor 84 and the steering motor 87 using a current position of the vehicle 41 which is acquired by the position acquisition unit 56, surrounding situations acquired by the image acquisition unit 70 and the millimeter-wave radar 92, and information such as residual capacity of the battery 83, the automated driving is realized. A vehicle speed or the like is decided with reference to speed limit information of the road which is assigned to logic NW data 35 as an attribute. An interval from a front vehicle is acquired by the millimeter-wave radar 92, and colors of signals are acquired by the image acquisition unit 70. Acceleration and deceleration are performed. A hydraulic brake system (not illustrated) is also provided, but typical braking is realized by a regenerative brake using power regeneration caused by the running motor 84. Regenerated electric energy is used to charge the battery 83.

In this way, how to realize the lane change during the automated driving of the vehicle 41 will be described below. When the routine of the lane change process illustrated in FIG. 15 is initiated, a process of acquiring the current position of the vehicle 41 is performed first (step S 610). The current location may be obtained from positional information acquired by the position acquisition unit 56 of the vehicle 41. Further, surrounding images acquired by the image acquisition unit 70 may be obtained by contrast with feature data.

When the current position is detected, then it is determined whether to pass a recommended lane change place (step S620). As described in the first embodiment, the recommended lane change place is a location at which weighting (cost) is lowest among lane change links. When it is determined that the vehicle passes through this location, a lane change process (step S700) is performed. This lane change process is specifically a process of controlling running of the vehicle 41 along the lane change links described in the first embodiment. When the vehicle passes through the recommended lane change place, the running motor 84 and the steering motor 87 are controlled to cause the vehicle 41 to run along a route searched by a route search process of a lane NW level while confirming the surrounding situations of the vehicle 41 between the recommended lane change place and the final lane changeable place.

Naturally, in some cases, the lane change is directly allowed along the route having the lowest cost among the lane change links. If another vehicle that is an object is present in the vicinity of the vehicle 41, the lane change process is rejected at the closest lane change link by the signal from the image acquisition unit 70 or the millimeter-wave radar 92. Therefore, after the lane change process is attempted, it is determined whether the lane change is completed at the following step S630. When the lane change is completed ("YES" of step S630), the process transitions to step S120 in FIG. 14, and is restarted from the acquisition of the current position. Accordingly, the next lane change is prepared with the automated driving.

On the other hand, when the determination at step S630 of FIG. 15 is "NO," namely when it is determined that the lane change is not completed, it is subsequently determined whether or not the vehicle 41 passes through the final lane changeable place (step S640). When the vehicle 41 does not pass through the final lane changeable place, the process returns to step S700 and is restarted from the lane change process. That is, the lane change is further attempted along the lane change links. Although this process is repeated, when the vehicle 41 does not complete the lane change, the vehicle 41 may pass through the final lane changeable place with no lane change. In this case, the determination at step S640 is "YES," the process returns to step S200 of FIG. 14, namely is restarted from the route research to the logic NW level. This is because, naturally, the vehicle 41 cannot run along a route scheduled in the beginning and follows another route due to the lane change. In this case, another route reaching the destination location is searched, and autonomous running of the vehicle and a necessary lane change process are continued based on this result. This process is repetitively performed until the vehicle 41 arrives at the destination location (step S140).

As the aforementioned lane change driving process is performed, the vehicle control system 100 of the second embodiment can realize the necessary lane change while automatically driving the vehicle 41. However, as described in the first embodiment, the lane change allowable level data 36 relating to the lane change stores two-level information for physical conditions on which the lane change is limited and three-level information for legal restrictions and their presence or absence, and can change a range of the lane change based on this. For example, when the lane change is performed by the autonomous driving because it is possible to designate whether or not the section of level 4 is included in the lane change link, it is possible to designate whether or not the section of level 4 is included in a lane change section at the server 20 side, for example, due to a degree of congestion of the road of that time zone. As a result, even in the autonomous driving, a range in which the lane change links are made can be widened or narrowed. For example, when the lane change is adopted to be performed only in the section of level 5 and is not completed only in that range, and when a lane changeable range extends by adding the section of level 4, it is possible to add the section of level 4 to remake the lane change links when it is determined that the vehicle passes through the final lane changeable place (step S 640 of FIG. 15), and to attempt the lane change.

Third Embodiment

Figure 16:
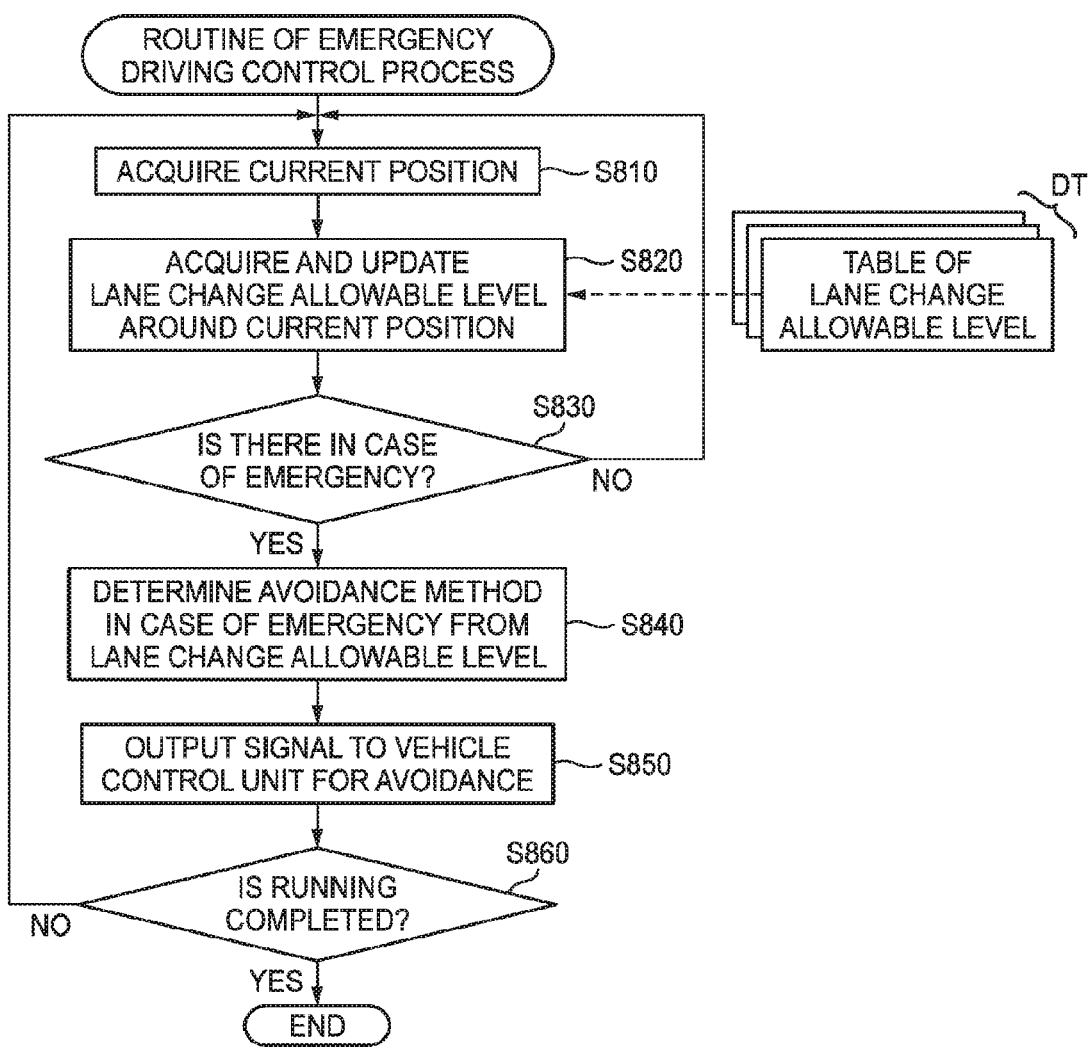
FIG. 16 is a flow chart illustrating a routine of an emergency driving control process indicating contents of a process of performing emergency driving control as a third embodiment.

Next, a third embodiment of the disclosure will be described. A vehicle control system 100 of the third embodiment is provided with the same hardware configuration as the second embodiment, and carries out the autonomous driving and the lane change driving process (FIGS. 14 and 15) described in the second embodiment. Furthermore, the vehicle control system 100 of the third embodiment performs a routine of an emergency driving control process illustrated in FIG. 16. The process illustrated in FIG. 16 is always carried out independently of the process described in the second embodiment. This parallel process may be realized, for example, by providing a separate processor or be realized using an interrupt process that is repetitively performed at a given interval.

In this process, first, a current location of the vehicle 41 is acquired (step S810), a lane change allowable level around the current position is acquired and stored in the temporary memory unit 55 of the vehicle 41 side, and is updated to newest information (step S820). The acquisition of the lane change allowable level is performed with reference to "a table DT of the lane change allowable level" illustrated in FIG. 17. As illustrated in FIG. 4, this table is assigned to the lane NW attribute data 35, and can be acquired anytime based on a current running position of the vehicle 41. The third embodiment is different from the first and second embodiments in that, in an example illustrated in FIG. 17, the lane change allowable level is stored as any of four levels from a value of 1 to a value of 4. Naturally, at least one of level 3 or level 5 or more may be stored. A number corresponding to any level within this lane change allowable level of each lane is stored in the lane NW attribute data. Storing the data of this lane change allowable level in the temporary memory unit 55 of the vehicle 41 is intended for prompt correspondence at the vehicle 41 side in case of emergency.

After the data of this lane change allowable level is updated, it is determined whether or not there is in case of emergency (step S830). In this embodiment, there is in case of emergency refers to when it is determined that contact with another vehicle cannot be avoided (accident avoidance) by an acceleration process of the vehicle 41 based on a signal from the millimeter-wave radar 92. Whether or not there is in case of emergency may be independently determined by the interrupt process that is independent of the process illustrated in FIG. 16 and is repetitively performed at a short interval. Moreover, whether or not there is in case of emergency may be determined by an image acquired by the image acquisition unit 70. Further, the emergency process may be adopted to be initiated with an abrupt operation of a brake (not illustrated) as a starting point, and then a content to be avoided may be adopted to be determined from the signal from the millimeter-wave radar 92 or the like. If there is not in case of emergency, the process returns to step S810, and is repeated from the acquisition of the current position of the vehicle 41.

On the other hand, when it is determined that there is in case of emergency ("YES" of step S830), an avoidance method in case of emergency is determined from the lane change allowable level that is stored in temporary memory unit 55 for the lane change into a surrounding lane (step S840). Since the emergency determination is performed as a situation in which the contact with the other vehicle can be avoided by an acceleration of the vehicle 41, the avoidance method considered to be allowable is a change of an advancing direction of the vehicle. Typically, this change of the advancing method is to overpass the lane. Therefore, whether to avoid to the right side or to the left side from a lane in which a current vehicle runs with reference to the data of the lane change allowable level stored in the temporary memory unit 55. When the lane change allowable level for the lane change into any one of the left and right lanes has a value of 1, and the lane change allowable level for the lane change into the other lane has a value above 2, to avoid to the other side is selected. When the lane change allowable level for the lane change into the other side has a value of 2, it is determined that there are physical obstacles, a change into a lane of level 2 is not preformed in typical running, and there is an obstacle which the vehicle can ride over in case of emergency, and the lane change in that direction is not prohibited.

Naturally, when the lane change allowable level for the lane change into any one of the left and right lanes has the value above 2, whether to change the advancing direction into either side may be adopted to select a side that easily avoid the contact with the other vehicle without depending on the comparison of the value of the lane change allowable level.

In this way, when the contact with the other vehicle is avoided by the change of the advancing method associated with the lane change, the driving control device 51 outputs a signal to the vehicle control unit 80, and drives the running motor 84 and the steering motor 87 (step S850). As a result, according to circumstances, the vehicle runs toward another lane while riding over the road cone (pylon) or the like, and avoid the contact with another vehicle. Afterwards, it is determined whether to terminate the running of the vehicle (step S860). Further, when the vehicle continues to run, the process from step S810 may be continued. When the running of the vehicle is terminated ("YES" of step S860), the process leads to "END" and is terminated.

According to the third embodiment described above, the vehicle control system 100 decides a direction of avoidance based on the lane change allowable level for the lane change into the other lane from a current driving lane in case of emergency in which the contact with the other vehicle cannot be avoided without the change of the advancing direction associated with the lane change. At this point, two types are further provided to a level to which the lane change is not allowed because of the physical obstacle, and discrimination between an obstacle (level 1) which the vehicle does not ride over such as a sidewall or a soundproof wall and an obstacle (level 2) which the vehicle rides over such as a pylon or a cat's-eye is provided. As a result, during typical running of the vehicle, although the obstacle is not treated as a lane changeable target to any level, the lane change into a direction in which the physical obstacle which the vehicle can ride over in the case of emergency is treated as being allowed. As a result, a degree of freedom of avoidance operation in case of emergency can be widened, and the contact with the other vehicle can be easily avoided.

In the vehicle control system 100 of the third embodiment, without being determined only by the data of the lane change allowable level of the lane change into the surrounding lane in advance, the emergency avoidance method may be decided by fetching information about a wall or a signal lamp, a bridge, and so on that are present on the spot from information about the image acquired by the image acquisition unit 70 or the adjacent object acquired by the millimeter-wave radar 92 and by adding presence of these objects. Except that the image or the information from the millimeter-wave radar is used, it may be determined using a beacon which a feature emits. A device outputting a beacon in advance may be provided for a feature that can be treated as an obstacle on a lane.

While several embodiments of the disclosure have been described, the disclosure is not limited to these embodiments, and can be naturally carried out on various modes without departing from the gist of the disclosure. For example, the lane change support system 10 of the first embodiment and the vehicle control system 100 of the second and third embodiments may be mounted on a two-wheeled vehicle. As the lane change allowable level, for example, big data acquired in connection with the running of the vehicle may be analyzed, and the levels may be assigned from an incidence rate of accidents or incidence conditions.

However, these technologies merely store, as it were, binary information, including whether or not the lane change is prohibited, to guide the lane change, and cannot flexibly cope with practical situations of the road in some cases. If only the voice guide of the lane change is performed, this information is sufficiently useful. However, from the viewpoint of the driving support, for example, when an attempt to realize automation of the lane change or automatic driving, it is assumed that it is not possible to sufficiently cope with such information including whether or not the lane change is prohibited.

The first, second and third embodiment has been made to solve at least some of the aforementioned problems, and there is to provide a lane change support device that can be realized as the following aspects or applications.

What is claimed is:

1. A lane change support device comprising:
   memory circuitry configured to store at least one of a plurality of control levels having different reasons for restricting a lane change for each lane of a road in association with a position on the lane; and
   control circuitry configured to support the lane change of a vehicle with reference to a control level of the lane change at the position on the lane in which the vehicle runs, wherein the control circuitry:
   determines whether the lane change is allowed from the control level with reference to the control level of the lane change at a position of the vehicle on the lane; and
   changes a course of the vehicle when it is determined that the lane change is allowed.

2. The lane change support device according to claim 1, wherein the memory circuitry:
   stores road network information indicating a connection relation of the road;
   decides a driving route of the vehicle using the road network information;
   decides a lane in which the vehicle should run with reference to the control level of the lane change in the decided driving route; and
   outputs a request for a course change to which the lane change is attributed based on a current position of the vehicle and the decided lane.

3. The lane change support device according to claim 1, wherein the control circuitry outputs a request for a course change to which accident avoidance is attributed based on a position relation between the vehicle and a target including another vehicle around the vehicle.

4. A lane change support device comprising:
   memory circuitry configured to store each of a plurality of pieces of section information and lane change information about whether or not a lane change into a neighboring lane is allowed in an associated state; and
   control circuitry configured to support the lane change of a vehicle using the lane change information associated with the section information based on a position at which the vehicle runs,
   wherein each of the plurality of pieces of section information is information about a given section of a lane on a road, and has information indicating a connection relation between front and rear sections, and
   wherein the control circuitry determines whether or not the lane change is allowed using the lane change information, and outputs a request for a course change of the vehicle when it is determined that the lane change is allowed.

5. A lane change support device comprising:
   memory circuitry configured to store road network information indicating a connection relation of a road and a plurality of pieces of section information in an associated state, and store each of the plurality of pieces of section information and lane change information about whether or not a lane change into a neighboring lane is allowed in an associated state; and
   control circuitry configured to decide a driving route of a vehicle using the road network information and to support the lane change of the vehicle using the lane change information associated with the section information based on a position at which the vehicle runs on the driving route,
   wherein each of the plurality of pieces of section information is information about a given section of a lane on a road, and has information indicating a connection relation between front and rear sections, and
   wherein the control circuitry determines whether or not the lane change is allowed using the lane change information, and outputs a request for a course change of the vehicle when it is determined that the lane change is allowed.

6. The lane change support device according to claim 1, wherein the memory circuitry includes information related to physical obstacles and legal restriction.

7. The lane change support device according to claim 4, wherein the memory circuitry includes information related to physical obstacles and legal restriction.

8. The lane change support device according to claim 5, wherein the memory circuitry includes information related to physical obstacles and legal restriction.

9. The lane change support device according to claim 1, wherein the control circuitry presents information about the lane change inside the vehicle using the lane change information.

10. The lane change support device according to claim 4, wherein the control circuitry presents information about the lane change inside the vehicle using the lane change information.

11. The lane change support device according to claim 5, wherein the control circuitry presents information about the lane change inside the vehicle with reference to the control level of the lane change.

12. The lane change support device according to claim 9, wherein the control circuitry changes contents of the information about the lane change according to a distance from a point at which the lane change should be completed to run on a driving route of the vehicle.

13. The lane change support device according to claim 12, wherein the point at which the lane change should be completed is a point located at a front edge of a lane change restriction lane.

14. The lane change support device according to claim 12, wherein the point at which the lane change should be completed is at least one of an entrance location of an intersection, a width reduction location, and a branch location.

15. The lane change support device according to claim 14, wherein, when the lane change performed up to the point at which the lane change should be completed is a lane change into an overtaking lane, the control circuitry presents the information about the lane change after the distance from the point is equal to or less than a given distance.

* * * * *